(12) United States Patent
Knischka et al.

(10) Patent No.: US 7,829,643 B2
(45) Date of Patent: Nov. 9, 2010

(54) COATING COMPOSITIONS CONTAINING LEVELLING AGENTS PREPARED BY NITROXYL MEDIATED POLYMERISATION

(75) Inventors: Ralf Knischka, Lörrach (DE); Clemens Auschra, Freiburg (DE); Andreas Mühlebach, Frick (CH); Sevgi Zeren, Flawil (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 886 days.

(21) Appl. No.: 10/581,137

(22) PCT Filed: Dec. 1, 2004

(86) PCT No.: PCT/EP2004/053186

§ 371 (c)(1),
(2), (4) Date: May 31, 2006

(87) PCT Pub. No.: WO2005/059048

PCT Pub. Date: Jun. 30, 2005

(65) Prior Publication Data

US 2008/0280070 A1 Nov. 13, 2008

(30) Foreign Application Priority Data

Dec. 10, 2003 (EP) .................. 03104624

(51) Int. Cl.
*C08F 2/00* (2006.01)

(52) U.S. Cl. .................. 526/220; 526/204; 526/217; 526/229.5

(58) Field of Classification Search .................. 526/204, 526/217, 220, 229.5
See application file for complete search history.

(56) References Cited

U.S. PATENT DOCUMENTS

| | | | | |
|---|---|---|---|---|
| 4,711,944 A * | 12/1987 | Sherwin et al. | ........ | 526/318.42 |
| 6,197,883 B1 * | 3/2001 | Schimmel et al. | ........... | 525/111 |
| 6,433,100 B1 * | 8/2002 | Kramer et al. | ........... | 525/327.6 |
| 6,583,245 B1 * | 6/2003 | Steinmann et al. | ........ | 526/218.1 |
| 6,936,670 B2 * | 8/2005 | Kramer et al. | ............... | 526/265 |

OTHER PUBLICATIONS

English language abstract for JP 6240201, Aug. 30, 1994.

* cited by examiner

Primary Examiner—David Wu
Assistant Examiner—Vu A Nguyen
(74) Attorney, Agent, or Firm—Tyler A. Stevenson

(57) ABSTRACT

The present invention relates to coating compositions containing a polymeric or copolymeric levelling agent, which has been prepared by nitroxyl-mediated polymerisation. Further aspects are a process for the preparation of smooth surface coatings and the use of said polymer or copolymer as levelling agent in coating compositions. Yet another aspect are specific ethylenically unsaturated monomer compositions from which copolymers can be obtained by atom transfer radical polymerisation or nitroxyl mediated polymerisation, which copolymers are useful as levelling agents in coating compositions. Still another aspect is the use of poly-tert.-butyl acrylate or poly-tert.butylmethacrylate as a levelling agent in powder coating compositions.

15 Claims, No Drawings

COATING COMPOSITIONS CONTAINING LEVELLING AGENTS PREPARED BY NITROXYL MEDIATED POLYMERISATION

The present invention relates to coating compositions containing a polymeric or copolymeric levelling agent, which has been prepared by nitroxyl-mediated polymerisation. Further aspects are a process for the preparation of smooth surface coatings and the use of said polymer or copolymer as levelling agent in coating compositions. Yet another aspect are specific ethylenically unsaturated monomer compositions from which copolymers can be obtained by atom transfer radical polymerisation or nitroxyl mediated polymerisation, which copolymers are useful as levelling agents in coating compositions. Still another aspect is the use of poly-tert.-butyl acrylate or poly-tert.-butyl methacrylate as a levelling agent in powder coating compositions.

In the context of the present invention it is understood that the term coating compositions defines organic coating compositions.

Smooth and crater free surfaces are required for almost all coating applications, because they provide not only an aesthetic but also a protective function. In case that the coating is not homogenous and some parts of the surface are not, or only very thinly coated a poor protection results. In order to achieve a smooth surface, levelling agents are added to all sorts of coatings. Suitable levelling agents are, for example, polymers or copolymers derived from ethylenically unsaturated monomers, such as acrylates or methacrylates. In the case of liquid coating formulations a large number of levelling agents is known and commercially available. As long as the viscosity of the coating formulation is low, a sufficient levelling can be obtained with these conventional levelling agents. Increasing problems are observed when the viscosity increases, such as is the case for high solids coatings or particularly for powder coatings. Especially in the case of thermally or radiation curable powder coatings there is a strong demand for additives improving the levelling of the coating.

Attempts have therefore been made to improve the action of levelling agents in thermosetting coatings by controlling the polymer architecture. For example U.S. Pat. No. 6,197,883 discloses thermosetting coating compositions containing a levelling agent, which has been polymerised using atom transfer radical polymerisation techniques (ATRP).

WO 03/027155 further describes thermosetting coating compositions containing a copolymer levelling agent with siloxane or perfluoralkyl moieties, prepared by an ATRP process.

However, there is still a need for improved levelling agents, which offer a different and improved balance of properties, e.g. with respect to levelling performance, yellowing tendency and handling characteristics. Thus an optimised control of the polymer architecture appears to be the key for improvement.

The present invention relates to a coating composition containing a levelling agent, which has been synthesized by nitroxyl mediated free radical polymerization (NO. and NOR). Linear, branched, tapered and graft structures can be obtained with a variety of monomers, depending on the functionality and reactivity of the nitroxylether or nitroxyl radical used. This type of controlled free radical polymerisation allows the synthesis of polymers or copolymers with well-defined molecular weights and narrow molecular weight distributions. By adjusting the molecular weight, liquid or solid (co)polymers can be obtained.

In particular, for powder coatings a solid levelling agent is of great advantage. Usually liquid levelling agents have to be formulated into a solid product form by preparing a master batch in the respective powder coating, adsorbing it onto silica or applying another solid carrier. This leads to an increase in production costs as well as stock keeping. As the compounds are no longer 100% active a higher amount has to be added to the coating formulation. A solid active material alleviates the problem of stock keeping of different master batches and allows the addition of lower amounts to the formulation. With the instant invention powder coatings can be formulated containing for example a homo- or copolymerisate of various acrylate/methacrylate monomers with narrow molecular weight distribution and a glass transition temperature $T_g$ or melting temperature $T_m$ higher than 30° C. so that the materials can be handled as solid compounds without the need for further formulation.

For many coating applications, such as for example clear coats or white solid shades, none or only a slight yellowish aspect is tolerable. Surprisingly it has been found that the levelling agents of the instant invention lead to a significantly reduced yellowing of the coatings, as compared to prior art levelling agents.

One aspect of the invention is a coating composition comprising
a1) a physically drying film forming binder resin or resins;
a2) a thermally cross linking film forming binder resin or binder resins;
a3) a radiation curable film forming binder resin or binder resins;
a4) an autoxidatively drying film forming binder resin or resins; or
a5) a combination of binder resins with at least two different crosslinking mechanisms selected from a1), a2), a3) or a4);
b) a polymer or copolymer levelling agent of formula (I) In-[$(M)_x$-$(E)_y$]$_n$ (I) obtained by nitroxyl mediated controlled free radical polymerisation wherein
In is the initiator fragment starting the polymerisation reaction;
M is at least one monomer selected from the group consisting of acrylic acid, methacrylic acid, acrylic acid ($C_1$-$C_{22}$) alkyl esters, acrylic acid ($C_1$-$C_{22}$)hydroxyalkyl esters, methacrylic acid ($C_1$-$C_{22}$)alkyl esters, methacrylic acid ($C_1$-$C_{22}$)hydroxyalkyl esters, acrylic acid ($C_1$-$C_{22}$)alkyl esters or methacrylic acid ($C_1$-$C_{22}$)alkyl esters which are substituted by amino, ($C_1$-$C_{22}$)alkylamino, ($C_1$-$C_{22}$)dialkylamino, —$SO_3H$, epoxy, fluoro, perfluoro or siloxane groups, styrene, substituted styrene, acrylamide and methacrylamide, N-mono($C_1$-$C_{22}$)alkyl acrylamide, N,N-di($C_1$-$C_{22}$)alkyl acrylamide, and a multifunctional monomer with two or more ethylenically unsaturated bonds;
provided that the amount of unsubstituted acrylic acid ($C_1$-$C_{22}$)alkyl esters or/and methacrylic acid ($C_1$-$C_{22}$)alkyl esters is more than 30% by weight based on the weight of the total monomer mixture;
E is a group bearing at least one stable free nitroxyl radical, which is bound via the oxygen atom to the polymer or copolymer; or a group which results from a substitution or elimination reaction of the attached stable free nitroxyl radical;
x is the total number of monomer units, which is a number between 5 and 5000;
y is a number 1 or greater than 1 indicating the average number of end groups E attached to the monomer sequence $(M)_x$;
n is a number from 1 to 20; and
c) optionally water or/and one or more organic solvents.

The $C_1$-$C_{22}$alkyl groups may be linear or branched. Examples of such alkyl groups are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl, octadecyl and eicosyl. $C_1$-$C_{18}$alkyl is preferred.

Film forming physically drying binder resins mentioned under a1) are typically derived from α,β-unsaturated acids and derivatives thereof such as polyacrylates and polymethacrylates; polymethyl methacrylates, polyacrylamides and polyacrylonitriles. Examples are thermoplastic polyacrylates (TPA).

Another class is for example derived from natural polymers such as cellulose acetate or butyrate. Also suitable are physically drying alkyd resins or nitrocellulose lacquers.

Thermally cross linking film forming binder resins mentioned under a2) are for example those given below.

1. Crosslinked polymers derived from aldehydes on the one hand and phenols, ureas and melamines on the other hand, such as phenol/formaldehyde resins, urea/formaldehyde resins and melamine/formaldehyde resins.

2. Drying and Non-Drying Alkyd Resins.

3. Unsaturated polyester resins derived from copolyesters of saturated and unsaturated dicarboxylic acids with polyhydric alcohols and vinyl compounds as crosslinking agents, and also halogen-containing modifications thereof of low flammability.

4. Crosslinkable acrylic resins derived from substituted acrylates, for example epoxy acrylates, urethane acrylates or polyester acrylates. These resins are typically crosslinked with melamine resins or (poly)isocyanate resins and known as thermosetting acrylics.

5. Alkyd resins, polyester resins and acrylate resins crosslinked with melamine resins, urea resins, isocyanates, isocyanurates, polyisocyanates or epoxy resins.

6. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

The cross linking alkyd resins which can be used as film forming binder resins in the present invention are the conventional stoving lacquers which are used in particular for coating automobiles (automobile finishing lacquers), for example lacquers based on alkyd/melamine resins and alkyd/acrylic/melamine resins (see H. Wagner and H. F. Sarx, "Lackkunstharze" (1977), pages 99-123). Other crosslinking agents include glycouril resins, blocked isocyanates or epoxy resins.

The coating compositions may be applied on wood, metal or plastic substrates.

The instant coating compositions are particularly suitable both for metal finish coatings and solid shade finishes of automobiles, especially in the case of retouching finishes, as well as various coil coating applications. The coating compositions in accordance with the invention are preferably applied in the conventional manner by two methods, either by the single-coat method or by the two-coat method. In the latter method, a pigment-containing base coat is applied first and then a covering coat of clear lacquer over it.

When water-soluble, water miscible or water dispersible coatings are desired ammonium salts of acid groups present in the resin are formed. Powder coating composition can be prepared by reacting glycidyl methacrylate with selected alcohol components, as will be outlined hereinafter.

The leveling agents, component b) are particularly useful when no organic solvent or water is present in the coating composition. This is typically the case for powder coatings.

Powder coating is a known technology and is described, for example, in "Ullmann's Encyclopedia of Industrial Chemistry, Fifth, Completely Revised Edition, Volume A 18", pages 438 to 444 (1991). In the powder coating process, a powder is generally fluidized with supply of air, electrostatically charged and applied to an earthed, preferably metallic substrate. The substrate is subsequently heated, in the course of which the adhering powder melts, coalesces and forms a coherent film on the metal surface. Since powder coating requires no solvent, this technology is especially friendly to the environment.

By powder coatings there are meant thermoplastic or stovable, crosslinkable polymers which are applied in powder form to predominantly metallic substrates. The manner in which the powder is brought into contact with the workpiece to be coated characterizes the various application techniques, for example electrostatic powder spraying with corona or triboelectric pistols, electrostatic fluidized-bed sintering or by using magnetic brush technology.

Preferred organic film-forming binders for the powder coating compositions according to the present invention are stoving systems based on, for example, epoxy resins, polyester-hydroxyalkylamides, polyester-glycolurils, epoxy-polyester resins, polyester-triglycidyl isocyanurates, hydroxyfunctional polyester-blocked polyisocyanates, hydroxyfunctional polyester-uretidiones, acrylate resins with hardener or mixtures of such resins. Also of interest are filmforming binders having thermoplastic properties, for example polyethylene, polypropylene, polyamides, polyvinyl chlorides, polyvinylidene dichloride or polyvinylidene difluoride.

Polyesters are generally hydroxy- or carboxy-functional and are usually prepared by condensation of diols and dicarboxylic acids. The addition of polyols and/or polyacids produces branched polyesters which then, on stoving in the presence of crosslinkers, give rise to network structures which impart to the coating the desired physical properties, such as scratch resistance, impact strength and flexural strength. Instead of multifunctional acids it is also possible to use anhydrides or acid chlorides, for example maleic anhydride, itaconic anhydride, phthalic anhydride, terephthalic anhydride, hexahydroterephthalic anhydride, trimellitic anhydride, pyromellitic dianhydride or succinic anhydride. It is also possible to use simple esters, for example dimethyl terephthalate, polymerization proceeding by transesterification with elimination of the volatile alcohol. Likewise practicable is preparation by a combination of transesterification and condensation. Furthermore, polyesters can be prepared by polycondensation of hydroxycarboxylic acids, for example 12-hydroxystearic acid and hydroxypivalic acid, or the corresponding lactones, for example ε-caprolactone. Examples of dicarboxylic acids and polyacids include terephthalic acid, isophthalic acid, adipic acid, azelaic acid, sebacic acid, 1,12-dodecanedioic acid, pyromellitic acid, 3,6-dichlorophthalic acid, succinic acid, 1,3-cyclohexanedicarboxylic acid and 1,4-cyclohexanedicarboxylic acid. Examples of diols and polyols include ethylene glycol, propylene glycol, glycerol, hexanetriol, hexane-2,5-diol, hexane-1,6-diol, pentaerythritol, sorbitol, neopentylglycol, trimethylolethane, trimethylolpropane, tris-1,4-cyclohexanedimethanol, trimethylpentanediol, 2,2-diethyl-1,3-propanediol, 2-methyl-2-butyl-1,3-propanediol, Esterdiol 204 (ester of hydroxypivalic acid and neopentylglycol), hydrogenated bisphenol A, bisphenol A, hydroxypivalic acid, hydroxypivalate esters, 2-butyl-2-ethyl-1,3-propanediol, 1,4-butanediol, 2-butene-1,4-diol, 2-butyne-1,4-diol or 2-methyl-1,3-propanediol.

Suitable crosslinking agents for carboxy-functional polyesters are epoxy compounds, for example Novolac®-epoxy resins, diglycidyl ethers of bisphenol A, hydrogenated bisphenol A and bisphenol A modified by reaction with, for example, aliphatic dicarboxylic acids. Also suitable are reactive epoxy compounds, such as triglycidyltriazolidine-3,5-dione, the glycidyl esters of polyacids, for example diglycidyl terephthalate and diglycidyl hexahydroterephthalate, hydantoin epoxides (U.S. Pat. No. 4,402,983) and, very particularly, triglycidyl isocyanurate and aliphatic polyepoxy compounds such as, for example, Araldit® PT910 (formerly Ciba Specialty Chemicals) and also epoxidized polyunsaturated fatty acid esters such as, for example, Uranox® (DSM). Other crosslinking agents for carboxy-functional polyesters are β-hydroxyalkylamides (see U.S. Pat. No. 4,076,917), for example the primarily tetrafunctional β-hydroxyalkylamide derivative of adipic acid (Primid® XL552 and Primid® QM 1260 from Rohm & Haas). Derivatives of melamine, benzoguanimine and glycoluril which are alkylated with low molecular mass alcohols have also been found to be suitable. Examples are tetramethylmethoxyglycoluril (Powderlink® 1174 from American Cyanamid). Other known crosslinking agents are bis- and trisoxazolidines, for example 1,4-bisoxazolidinobenzene.

Recent substances are carboxy-functional polyesters which include chemically bonded epoxy groups and as a consequence are able to crosslink with themselves (Molhoek et al., 22nd Fatipec Congress, 15.-19.5.95, Budapest, Vol. 1, 119-132).

In all systems in which an epoxy group or a glycidyl radical reacts with a carboxyl group or with an anhydride in a crosslinking reaction, catalysts can be employed. Examples are amines or metal compounds, for example aluminium acetylacetonate or tin octoate.

As crosslinking agents for hydroxy-functional polyesters the polyisocyanate crosslinkers are of particular importance. In order to prevent premature crosslinking owing to the high reactivity of isocyanates and in order to obtain good levelling of the melted powder, the polyisocyanates are blocked (internally as a uretdione or as an adduct with a blocking agent). Blocking agents most frequently employed are caprolactam, methyl ethyl ketoxime or butanone oxime. Other suitable blocking agents for isocyanates are described in the publications by G. B. Guise, G. N. Freeland and G. C. Smith, J. Applied Polymer Science, 23, 353 (1979) and of M. Bock and H.-U. Maier-Westhues in "Progress in Product Development for Powder Coating Technology, XIXth Int. Conf. on Organic Coatings, Science and Technol., Athens, 12-16 Jul.", 1993. Examples of blocked and unblocked polyisocyanates include 2-methylpentane 1,5-diisocyanate, 2-ethylbutane 1,4-diisocyanate, 3(4)-isocyanatomethyl-1-methylcyclohexyl isocyanate, 3-isocyanatomethyl-3,5,5 trimethylcyclohexane diisocyanate, tris(isocyanatomethyl)benzene, 4,4'-diisocyanatodicyclohexylmethane, 1,4-bis(isocyanatomethyl)cyclohexane, m-tetramethylxylene diisocyanate, p-tetramethylxylene diisocyanate and, in particular, isophorone diisocyanate. For reaction of the unblocked diisocyante it is common to add a metallic catalyst, for example tin octoate, dibutyltin oxide or dibutyltin dilaurate, to the polyisocyanate formulation.

Further suitable crosslinking agents for hydroxy-functional polyesters are anhydrides, for example trimellitic anhydride and its reaction products with diols and diamines. Further examples of such crosslinking agents are described by T. A. Misev in "Powder Coatings: Chemistry and Technology", J. Wiley & Sons, Chichester on pages 123 and 124.

Polyacrylates, which commonly have hydroxyl, carboxyl or glycidyl functionality, are also employed as binders for powder coatings. They are prepared by the customary methods, principally from monomers such as, for example, styrene and linear or branched $C_1$-$C_8$alkyl esters of acrylic acid or methacrylic acid. Other ethylenically unsaturated compounds, for example divinylbenzene, acrylamide, methacrylamide, butoxymethylacrylamide, acrylonitrile or butadiene can also be added and copolymerized. Hydroxyl functionality is ensured by the copolymerization of hydroxy-functional monomers, for example hydroxyethyl acrylate, hydroxyethyl methacrylate, hydroxypropyl acrylate, hydroxypropyl methacrylate. For carboxyl functionality, ethylenically unsaturated acids and anhydrides are used, for example acrylic acid, methacrylic acid, itaconic acid, crotonic acid, maleic anhydride, itaconic anhydride, acrylic anhydride or methacrylic anhydride (U.S. Pat. No. 3,836,604). Glycidyl functionality is given, as taught in EP-A-0 256 369 and U.S. Pat. No. 3,876,578, by the copolymerization of monomers such as glycidyl acrylate and glycidyl methacrylate. As crosslinking agents for polyacrylates with hydroxyl or carboxyl functionality it is possible in principle to use the same compounds as already described for the polyesters with hydroxyl or carboxyl functionality. Further suitable crosslinking agents are the epoxy compounds of U.S. Pat. No. 0,045,040. Suitable crosslinking agents for polyacrylates with glycidyl functionality are dicarboxylic acids, for example sebacic acid, 1,12-dodecanedicarboxylic acids, and anhydrides, for example bistrimellitic anhydride, and the compounds described in U.S. Pat. No. 3,880,946. Furthermore, autocrosslinking polyacrylates from DE-A-3 310 545 are also known.

Epoxy resins for powder coatings are mostly either Novolac®-epoxy resins or, in particular, those based on aromatic polyols, especially those based on bisphenol such as bisphenol A. Also known are modified bisphenol-epoxy resins, from JP-A-58 187 464 (1982). The epoxy resins are employed in combination with crosslinkers from the classes of the solid aliphatic amines, solid aromatic amines, amine adducts, phenolic resins, polyacids and the carboxy-functional polyesters already described. Very particular mention as hardeners is to be made of the dicyandiamides, which are frequently employed together with a catalyst such as Lewis acids, boron trifluoride-amine complexes, metal complexes, tertiary or quaternary amines, and imidazoline derivatives, such as 2-methylimidazoline.

In the powder coating compositions according to the present invention the resin and the crosslinking agent are employed judiciously in approximately stoichiometric amounts. Deviation from the stoichiometric amounts by more than 30% leads in most cases to a decrease in the desired physical properties of the cured coating film, for example flexibility, impact strength, adhesion, weathering resistance or solvent resistance.

Preferred powder coating compositions include, as further additives, one or more components from the group of the pigments, dyes, fillers, waxes, levelling assistants, degassing agents, charge control agents, optical brighteners, adhesion promoters, antioxidants, light stabilizers, curing catalysts or photoinitiators. The powder coating compositions may also include corrosion inhibitors, for example anticorrosion pigments, such as phosphate- or borate-containing pigments or metal oxide pigments, or other organic or inorganic corrosion inhibitors, for example salts of nitroisophthalic acid, phosphoric esters, technical-grade amines or substituted benzotriazoles.

Suitable photoinitiators for radiation curable powder coating compositions, which are cured, for example, with UV light are those based on benzophenones, phenylglyoxalates, bis- and/or mono-acylphosphine oxides, α-hydroxy ketones or benzil dimethyl ketals. As light sources it is judicious to employ medium-pressure or high-pressure mercury lamps. A more detailed description of radiation curable coating composition is given below.

Examples of degassing agents are fatty acid amides as described in EP-A-0 471 409, ε-caprolactam, methyl isophthalate and dimethyl isophthalate (EP-A-284 996) and, very particularly, benzoin.

Examples of conventional levelling assistants are epoxidized fatty acids, abietyl alcohol, polylauryl methacrylate, polylauryl acrylate, polydimethylsiloxane-polyalkylene oxide block copolymers or, in particular, polymers and copolymers of low molecular weight of $C_1$-$C_8$alkyl acrylate esters or alkyl methacrylate esters.

Adhesion promoters are based, for example, on modified silanes, titanates or zirconates.

An example of an optical brightener is Uvitex®OB (Ciba Specialty Chemicals).

The pigments are, for example, titanium dioxide, iron oxide, carbon black, aluminium bronze, phthalocyanine blue or aminoanthraquinone.

Examples of fillers are talc, alumina, aluminium silicate, aluminium phosphate, barytes, mica, lithopone, silica, calcium carbonate or magnesium carbonate, magnesium oxide, zinc oxide, zinc carbonate, zinc phosphate or mixtures thereof.

Radiation curable film forming binder resins mentioned under a3) are, besides the afore mentioned powder coatings, typically ethylenically unsaturated monomers or oligomers examples are given below.

The unsaturated compounds of the radiation-curable composition may contain one or more ethylenically unsaturated double bonds. They may be lower molecular weight (monomeric) or higher molecular weight (oligomeric). Examples of monomers having a double bond are hydroxyalkyl acrylates and methacrylates, e.g. 2-hydroxyethyl acrylate or methacrylate. Further examples are, acrylamide, methacrylamide, N-substituted (meth)acrylamides and acrylic or methacrylic acid.

Examples of monomers having more than one double bond are propylene glycol diacrylate, dipropylene glycol diacrylate, tripropylene glycol diacrylate, neopentyl glycol diacrylate, hexa-methylene glycol diacrylate pentaerythritol triacrylate, tris(hydroxyethyl) isocyanurate triacrylate (Sartomer® 368; from Cray Valley).

It is also possible in radiation-curable systems to use acrylic esters of alkoxylated polyols, for example glycerol ethoxylate diacrylate, glycerol propoxylate diacrylate, pentaerythritol propoxylate triacrylate, pentaerythritol propoxylate tetraacrylate, neopentyl glycol ethoxylate diacrylate or neopentyl glycol propoxylate diacrylate. The degree of alkoxylation of the polyols used may vary.

Examples of higher molecular weight (oligomeric) polyunsaturated compounds having additionally polar groups, such as —OH, —COOH or $NH_2$ are acrylated epoxy resins, acrylated or vinyl-ether- or epoxy-group-containing polyesters, polyurethanes and polyethers. Further examples of unsaturated oligomers are unsaturated polyester resins, which are usually produced from maleic acid, phthalic acid and one or more diols and have molecular weights of from 500 to 3000. In addition it is also possible to use vinyl ether monomers and oligomers, and also maleate-terminated oligomers having polyester, polyurethane, polyether, polyvinyl ether and epoxide main chains. In particular, combinations of vinyl-ether-group-carrying oligomers and polymers, as described in WO 90/01512, are very suitable, but copolymers of monomers functionalised with maleic acid and vinyl ether also come into consideration. Such unsaturated oligomers can also be termed prepolymers.

Especially suitable are, for example, esters of ethylenically unsaturated carboxylic acids and polyols or polyepoxides, and polymers having ethylenically unsaturated groups in the chain or in side groups, e.g. unsaturated polyesters, polyamides and polyurethanes and copolymers thereof.

Examples of unsaturated carboxylic acids are acrylic acid, methacrylic acid, crotonic acid, itaconic acid, cinnamic acid and unsaturated fatty acids such as linolenic acid or oleic acid. Acrylic and methacrylic acid are preferred.

Suitable polyols are aromatic and especially aliphatic and cycloaliphatic polyols. Examples of aromatic polyols are hydroquinone, 4,4'-dihydroxydiphenyl, 2,2-di(4-hydroxyphenyl)propane, and novolaks and resols. Examples of polyepoxides are those based on the said polyols, especially the aromatic polyols and epichlorohydrin. Also suitable as polyols are polymers and copolymers that contain hydroxyl groups in the polymer chain or in side groups, e.g. polyvinyl alcohol and copolymers thereof or polymethacrylic acid hydroxyalkyl esters or copolymers thereof. Further suitable polyols are oligoesters having hydroxyl terminal groups.

Examples of aliphatic and cycloaliphatic polyols include alkylenediols having preferably from 2 to 12 carbon atoms, such as ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol and sorbitol.

The polyols are partially esterified by one or by different unsaturated carboxylic acid(s).

Examples of esters are:

pentaerythritol diacrylate, pentaerythritol triacrylate, dipentaerythritol diacrylate, dipentaerythritol triacrylate, dipentaerythritol tetraacrylate, dipentaerythritol pentaacrylate, pentaerythritol dimethacrylate, pentaerythritol trimethacrylate, dipentaerythritol dimethacrylate, dipentaerythritol tetramethacrylate, pentaerythritol diitaconate, dipentaerythritol trisitaconate, sorbitol triacrylate, sorbitol tetraacrylate, pentaerythritol-modified triacrylate, sorbitol tetramethacrylate, sorbitol pentaacrylate, oligoester acrylates and methacrylates, glycerol di-acrylate.

Also suitable as a component are the amides of identical or different unsaturated carboxylic acids and aromatic, cycloaliphatic and aliphatic polyamines having preferably from 2 to 6, especially from 2 to 4, amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diamino-cyclohexane, isophoronediamine, phenylenediamine, bisphenylenediamine, di-β-aminoethyl ether, diethylenetriamine, triethylenetetramine and di(β-aminoethoxy)- and di(β-aminopropoxy)-ethane. Further suitable polyamines are polymers and copolymers which may have additional amino groups in the side chain and oligoamides having amino terminal groups. Examples of such unsaturated amides are: methylene bisacrylamide, 1,6-hexamethylene bisacrylamide, diethylenetriamine trismethacrylamide, bis(methacrylamidopropoxy)

ethane, β-methacryl-amidoethyl methacrylate and N-[(β-hydroxyethoxy)ethyl]-acrylamide.

Special preference is given to acrylic acid, hexanediol monoacrylate, pentaerythritol triacrylate, pentaerythritol diacrylate, pentaerythritol monoacrylate, 2-hydroxyethyl acrylate, hydroxypropyl acrylate, tri(propylene glycol) glycerolate diacrylate, 2,3-dihydroxypropylacrylate, 2,3-dihydroxypropylacrylate, glycerol 1,3-diglycerolate diacrylate, sorbitol monoacrylate, .N.-(2,3,4,5,6-pentahydroxy-hexyl)-acrylamide and the corresponding methacrylic acid and derivatives.

In the context of the present invention the term (meth) acrylate includes both the acrylate and the methacrylate. An acrylate or methacrylate compound is especially used as the mono- or poly-ethylenically unsaturated compound.

Photoinitiators suitable for use in the process according to the invention are in principle any compounds and mixtures that form one or more free radicals when irradiated with electromagnetic waves. These include initiator systems consisting of a plurality of initiators and systems that function independently of one another or synergistically. In addition to coinitiators, for example amines, thiols, borates, enolates, phosphines, carboxylates and imidazoles, it is also possible to use sensitisers, for example acridines, xanthenes, thiazenes, coumarins, thioxanthones, triazines and dyes. A description of such compounds and initiator systems can be found e.g. in Crivello J. V., Dietliker K. K., (1999): Chemistry & Technology of UV & EB Formulation for Coatings, Inks & Paints, and in Bradley G. (ed.) Vol. 3: Photo-initiators for Free Radical and Cationic Polymerisation 2nd Edition, John Wiley & Son Ltd. The photoinitiator suitable for the process according to the invention in step b) may be either an initiator having an unsaturated group or an initiator not having such a group Such compounds and derivatives are derived, for example, from the following classes of compounds: benzoins, benzil ketals, acetophenones, hydroxyalkylphenones, aminoalkylphenones, acylphosphine oxides, acylphosphine sulfides, acyloxyiminoketones, alkylamino-substituted ketones, such as Michler's ketone, peroxy compounds, dinitrile compounds, halogenated acetophenones, phenylglyoxylates, dimeric phenylglyoxalates, benzophenones, oximes and oxime esters, thioxanthones, coumarins, ferrocenes, titanocenes, onium salts, sulfonium salts, iodonium salts, diazonium salts, borates, triazines, bisimidazoles, polysilanes and dyes. It is also possible to use combinations of the compounds from the mentioned classes of compounds with one another and combinations with corresponding coinitiator systems and/or sensitisers.

Typical examples of individual photoinitiators are mentioned below, which can be used either singly or in admixture with one another. For example, benzophenones, benzophenone derivatives, acetophenone, acetophenone derivatives, for example α-hydroxy-cycloalkylphenyl ketone or 2-hydroxy-2-methyl-1-phenyl-propanone, dialkoxyacetophenones, α-hydroxy- or α-amino-acetophenones, for example (4-methylthiobenzoyl)-1-methyl-1-morpholino-ethane, (4-morpholino-benzoyl)-1-benzyl-1-dimethylamino-propane, (4-methyl-thiobenzoyl)-1-methyl-1-morpholino-ethane, (4-morpholino-benzoyl)-1-(4-methyl-benzyl)-1-dimethylamino-propane, 4-aroyl-1,3-dioxolanes, benzoin alkyl ethers and benzil ketals, e.g. benzil dimethyl ketal, phenylglyoxalates and derivatives thereof, dimeric phenylglyoxalates, monoacylphosphine oxides, for example (2,4,6-trimethylbenzoyl)-phenyl-phosphine oxide, bisacylphosphine oxides, for example bis(2,6-dimethoxybenzoyl)-(2,4,4-trimethyl-pent-1-yl)phosphine oxide, bis(2,4,6-trimethylbenzoyl)-phenyl-phosphine oxide or bis(2,4,6-trimethylbenzoyl)-(2,4-dipentyloxyphenyl)phosphine oxide, trisacylphosphine oxides, ferrocenium compounds or titanocenes, for example dicyclopentadienyl-bis(2,6-difluoro-3-pyrrolo-phenyl)-titanium and borate salts.

As coinitiators there come into consideration, for example, sensitisers which shift or broaden the spectral sensitivity and thus bring about an acceleration of the photopolymerisation. They are especially aromatic carbonyl compounds, for example benzophenone, thioxanthone, especially isopropyl thioxanthone, anthraquinone and 3-acylcoumarin derivatives, terphenyls, styryl ketones, and also 3-(aroylmethylene)-thiazolines, camphor quinone, and also eosine, rhodamine and erythrosine dyes.

Amines, for example, can also be regarded as photosensitisers when the photoinitiator layer grafted on according to the invention consists of a benzophenone or benzophenone derivative.

Further examples of photosensitisers are

1. Thioxanthones

Thioxanthone, 2-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxy-carbonylthioxanthone, 3-(2-methoxyethoxycarbonyl)-thioxanthone, 4-butoxycarbonylthio-xanthone, 3-butoxycarbonyl-7-methylthioxanthone, 1-cyano-3-chlorothioxanthone, 1-ethoxy-carbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxy-ethoxy)ethoxycarbonyl]thioxanthone, 1-ethoxycarbonyl-3-(1-methyl-1-morpholinoethyl)-thio-xanthone, 2-methyl-6-dimethoxymethyl-thioxanthone, 2-methyl-6-(1,1-dimethoxybenzyl)-thioxanthone, 2-morpholinomethylthioxanthone, 2-methyl-6-morpholinomethylthioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 1-phenoxycarbonyl-6-ethoxycarbonyl-2-methoxythioxanthone, 6-ethoxycarbonyl-2-methylthioxanthone, thioxanthone-2-polyethylene glycol ester, 2-hydroxy-3-(3,4-dimethyl-9-oxo-9H-thioxanthon-2-yloxy)-N,N,N-trimethyl-1-propanaminium chloride;

2. Benzophenones

Benzophenone, 4-phenylbenzophenone, 4-methoxybenzophenone, 4,4'-dimethoxybenzophenone, 4,4'-dimethylbenzophenone, 4,4'-dichlorobenzophenone, 4,4'-dimethylamino-benzophenone, 4,4'-diethylaminobenzophenone, 4-methylbenzophenone, 2,4,6-trimethyl-benzophenone, 4-(4-methylthiophenyl)-benzophenone, 3,3'-dimethyl-4-methoxybenzophenone, methyl-2-benzoyl benzoate, 4-(2-hydroxyethylthio)-benzophenone, 4-(4-tolylthio)-benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxamidecyl)-benzophenone, 4-benzoyl-N,N-dimethyl-N-[2-(1-oxo-2-propen-yl)oxy]ethyl-benzenemethanaminium chloride;

3. 3-Acylcoumarins

3-Benzoylcoumarin, 3-benzoyl-7-methoxycoumarin, 3-benzoyl-5,7-di(propoxy)coumarin, 3-benzoyl-6,8-dichlorocoumarin, 3-benzoyl-6-chlorocoumarin, 3,3'-carbonyl-bis[5,7-di(propoxy)coumarin], 3,3'-carbonyl-bis(7-methoxycoumarin), 3,3'-carbonyl-bis(7-diethylaminocoumarin), 3-isobutyroylcoumarin, 3-benzoyl-5,7-dimethoxycoumarin, 3-benzoyl-5,7-di-ethoxycoumarin, 3-benzoyl-5,7-dibutoxycoumarin, 3-benzoyl-5,7-di(methoxyethoxy)-coumarin, 3-benzoyl-5,7-di(allyloxy)coumarin, 3-benzoyl-7-dimethylaminocoumarin, 3-benzoyl-7-diethylaminocoumarin, 3-isobutyroyl-7-dimethylaminocoumarin, 5,7-dimethoxy-3-(1-naphthoyl)-coumarin, 5,7-dimethoxy-3-(1-naphthoyl)-coumarin, 3-benzoylbenzo[f]coumarin, 7-diethylamino-3-thienoylcoumarin, 3-(4-cyanobenzoyl)-5,7-dimethoxycoumarin;

4. 3-(Aroylmethylene)-thiazolines
3-Methyl-2-benzoylmethylene-β-naphthothiazoline, 3-methyl-2-benzoylmethylene-benzothiazoline, 3-ethyl-2-propionylmethylene-p-naphthothiazoline;

5. Other Carbonyl Compounds
Acetophenone, 3-methoxyacetophenone, 4-phenylacetophenone, benzil, 2-acetylnaphthalene, 2-naphthaldehyde, 9,10-anthraquinone, 9-fluorenone, dibenzosuberone, xanthone, 2,5-bis(4-diethylaminobenzylidene)cyclopentanone, α-(para-dimethylaminobenzylidene)-ketones, such as 2-(4-dimethylamino-benzylidene)-indan-1-one or 3-(4-dimethylamino-phenyl)-1-indan-5-yl-propenone, 3-phenylthiophthalimide, N-methyl-3,5-di(ethylthio)phthalimide, N-methyl-3,5-di(ethylthio)phthalimide.

Typical individual photoinitiator concentrations range from 0.01% to 5% by weight based on the weight of the binder resins and monomers.

As component c) there may optionally water and/or organic solvents be present. Suitable organic solvents are in principle any substances in which the binder components are soluble. In the case of water, emulsion or dispersions are provided. Suitable solvents are, for example, alcohols, such as ethanol, propanol, isopropanol, butanol, ethylene glycol, ketones, such as acetone, methyl ethyl ketone, acetonitrile, aromatic hydrocarbons, such as toluene and xylene, esters and aldehydes, such as ethyl acetate, ethyl formate, aliphatic hydrocarbons, e.g. petroleum ether, pentane, hexane, cyclohexane, halogenated hydrocarbons, such as dichloromethane, chloroform, or alternatively oils, natural oils, castor oil, vegetable oil and also synthetic oils. This description is on no account exhaustive and is given merely by way of example.

Preference is given to a coating composition comprising a2) a thermally cross linking film forming binder resin or binder resins; or a3) a radiation curable film forming binder resin or binder resins.

Further preference is given to a coating composition comprising a2) a thermally cross linking film forming binder resin or binder resins.

Particularly preferred is a coating composition comprising a2) a thermally cross linking film forming binder resin or binder resins without water and organic solvent, which is in the form of a solid powder.

This type of coating is conveniently called powder coating as already outlined.

As mentioned above it is mandatory that the polymer or copolymer levelling agent of formula (I), component b), is prepared by nitroxyl mediated controlled free radical polymerization (CFRP). Solomon et al. in U.S. Pat. No. 4,581,429 have firstly described such processes.

U.S. Pat. No. 4,581,429 discloses a free radical polymerization process by controlled or "living" growth of polymer chains, which produces defined oligomeric homopolymers and copolymers, including block and graft copolymers. Disclosed is the use of initiators of the partial formula R'R"N—O—X. In the polymerization process the free radical species R'R"N—O. and .X are generated. .X is a free radical group, e.g. a tert.-butyl or cyanoisopropyl radical, capable of polymerizing monomer units containing ethylene groups.

A variation of the above process is disclosed in U.S. Pat. No. 5,322,912 wherein the combined use of a free radical initiator and a stable free radical agent of the basic structure R'R"N—O. for the synthesis of homopolymers and block copolymers is described.

These processes are useful for the preparation of homo-, random-, block-, tapered-, graft- or comb (co)polymers, which have a narrow molecular weight distribution and hence a low polydispersity index.

As already mentioned it is indispensable that the (c)opolymers are obtained by nitroxyl mediated controlled free radical polymerization (CFRP). There are essentially two suitable routes:

b1) polymerization in the presence of alkoxyamine initiator/regulator compounds having the structural element

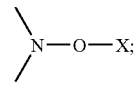

and b2) polymerization in the presence of a stable nitroxyl free radical having the structural element

and a radical initiator (source of free radicals).

For example the structural element

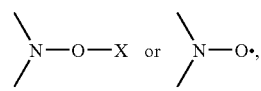

may be part of a cyclic ring system or substituted to form a acyclic structure.

Suitable nitroxylethers and nitroxyl radicals are principally known from U.S. Pat. No. 4,581,429 or EP-A-621 878. Particularly useful are the open chain compounds described in WO 98/13392, WO 99/03894 and WO 00/07981, the piperidine derivatives described in WO 99/67298 and GB 2335190 or the heterocyclic compounds described in GB 2342649 and WO 96/24620. Further suitable nitroxylethers and nitroxyl radicals are described in WO 02/4805 and in WO 02/100831.

Nitroxylethers and nitroxyl radicals with more than one nitroxyl group in the molecule are for example described in U.S. Pat. No. 6,573,347, WO 01/02345 and WO 03/004471. These compounds are ideally suitable when branched, star or comb (co)polymers are prepared. In this case y and/or n in formula (I) above are greater than 1.

In the context of the present invention the terms alkoxyamine and nitroxylether are used as equivalents.

Stable free radicals having a structural element

are for example disclosed in EP-A-621 878.

Examples, such as

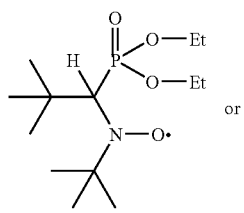

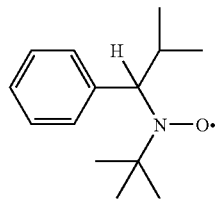

are given in WO 96/24620.

Preferably the structural elements

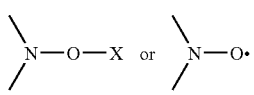

are part of a 5 or 6-membered heterocyclic ring, which optionally has an additional nitrogen or oxygen atom in the ring system. Substituted piperidine, morpholine and piperazine derivatives are particularly useful.

Preferably the structural element

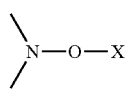

is a structural element of formula (II) and the structural element

is a structural element of formula (II')

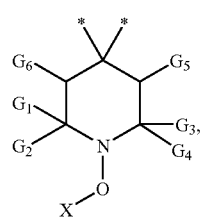

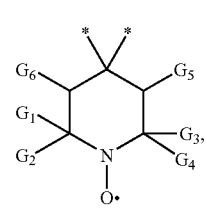

wherein $G_1, G_2, G_3, G_4$ are independently $C_1$-$C_6$alkyl or $G_1$ and $G_2$ or $G_3$ and $G_4$, or $G_1$ and $G_2$ and $G_3$ and $G_4$ together form a $C_5$-$C_{12}$cycloalkyl group;

$G_5, G_5$ independently are H, $C_1$-$C_{18}$alkyl, phenyl, naphthyl or a group COOC$_1$-C$_{18}$alkyl;

X is selected from the group consisting of

—CH$_2$-phenyl, CH$_3$CH-phenyl, (CH$_3$)$_2$ C-phenyl, (C$_5$-C$_6$cycloalkyl)$_2$CCN, (CH$_3$)$_2$CCN,

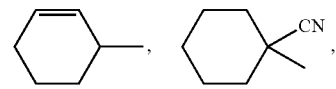

—CH$_2$CH═CH$_2$, CH$_3$CH—CH═CH$_2$ (C$_1$-C$_4$alkyl)CR$_{20}$—C(O)-phenyl, (C$_1$-C$_4$)alkyl-CR$_{20}$—C(O)—(C$_1$-C$_4$)alkoxy, (C$_1$-C$_4$)alkyl-CR$_{20}$—C(O)—(C$_1$-C$_4$)alkyl, (C$_1$-C$_4$)alkyl-CR$_{20}$—C(O)—N-di(C$_1$-C$_4$)alkyl, (C$_1$-C$_4$)alkyl-CR$_{20}$—C(O)—NH(C$_1$-C$_4$)alkyl, (C$_1$-C$_4$)alkyl-CR$_{20}$—C(O)—NH$_2$, wherein $R_{20}$ is hydrogen or (C$_1$-C$_4$)alkyl and

* denotes a valence.

In particular the structural element of formula (II) is of formula A, B or O,

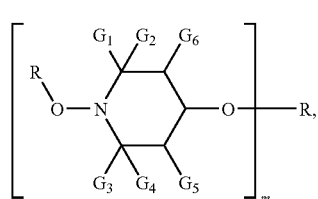

-continued

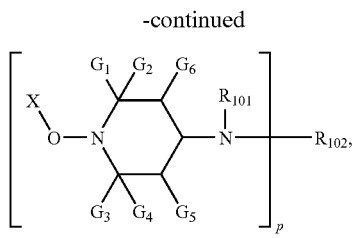
(B)

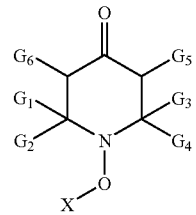
(O)

wherein m is 1,

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_{101}$ is $C_1$-$C_{12}$alkyl, $C_5$-$C_7$cycloalkyl, $C_7$-$C_8$ aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$—Z or of the formula —CO—Z or —CONH—Z wherein Z is hydrogen, methyl or phenyl;

$G_6$ is hydrogen and $G_5$ is hydrogen or $C_1$-$C_4$alkyl, $G_1$ and $G_3$ are methyl and $G_2$ and $G_4$ are ethyl or propyl or $G_1$ and $G_2$ are methyl and $G_3$ and $G_4$ are ethyl or propyl; and X is selected from the group consisting of —$CH_2$-phenyl, $CH_3CH$-phenyl, $(CH_3)_2C$-phenyl, ($C_5$-$C_6$cycloalkyl)$_2$CCN, $(CH_3)_2$CCN,

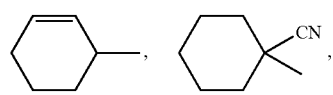

—$CH_2CH$=$CH_2$, $CH_3CH$—CH=$CH_2$ ($C_1$-$C_4$alkyl)$CR_{20}$—C(O)-phenyl, ($C_1$-$C_4$)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)—N-di($C_1$-$C_4$)alkyl, ($C_1$-$C_4$)alkyl-$CR_{20}$—C(O)—NH($C_1$-$C_4$)alkyl, ($C_1$-$C_4$)alkyl-$CR_{20}$—C(O)—$NH_2$, wherein $R_{20}$ is hydrogen or ($C_1$-$C_4$)alkyl.

The above compounds and their preparation are described in GB 2 335 190 and GB 2 361 235.

Another preferred group of nitroxylethers are those of formula (IIc), (IId), (IIe), (IIf), (IIg) or (IIh)

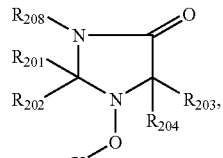
(IIc)

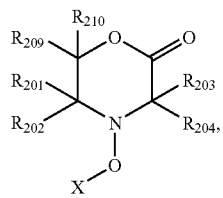
(IId)

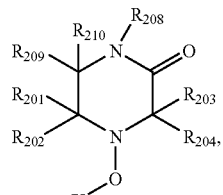
(IIe)

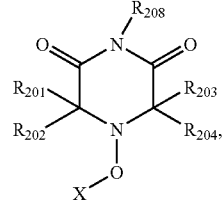
(IIf)

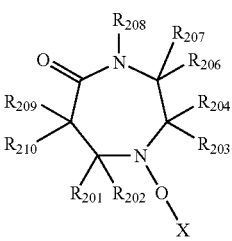
(IIg)

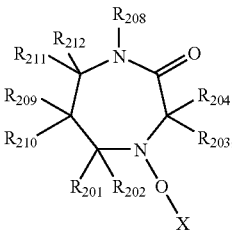
(IIh)

wherein $R_{201}$, $R_{202}$, $R_{203}$ and $R_{204}$ independently of each other are $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl or $R_{201}$ and $R_{202}$ and/or $R_{203}$ and $R_{204}$ together with the linking carbon atom form a $C_3$-$C_{12}$cycloalkyl radical;

$R_{205}$, $R_{206}$ and $R_{207}$ independently are hydrogen, $C_1$-$C_{18}$alkyl or $C_6$-$C_{10}$aryl;

$R_{208}$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by one or more OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl, $C_7$-$C_9$ phenylalkyl, $C_5$-$C_{10}$heteroaryl, —C(O)—$C_1$-$C_{18}$alkyl, —O—$C_1$-$C_{18}$alkyl or —COO$C_1$-$C_{18}$alkyl;

$R_{209}$, $R_{210}$, $R_{211}$ and $R_{212}$ are independently hydrogen, phenyl or $C_1$-$C_{18}$alkyl; and X is selected from the group consisting of —CH$_2$-phenyl, CH$_3$CH-phenyl, (CH$_3$)$_2$C-phenyl, ($C_5$-$C_6$cycloalkyl)$_2$CCN, (CH$_3$)$_2$CCN,

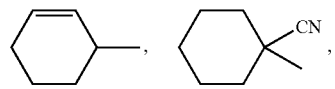

—CH$_2$CH=CH$_2$, CH$_3$CH—CH=CH$_2$ ($C_1$-$C_4$alkyl)C$R_{20}$—C(O)-phenyl, ($C_1$-$C_4$)alkyl-C$R_{20}$—C(O)—($C_1$-$C_4$)alkoxy, ($C_1$-$C_4$)alkyl-C$R_{20}$—C(O)—($C_1$-$C_4$)alkyl, ($C_1$-$C_4$)alkyl-C$R_{20}$—C(O)—N-di($C_1$-$C_4$)alkyl, ($C_1$-$C_4$)alkyl-C$R_{20}$—C(O)—NH($C_1$-$C_4$)alkyl, ($C_1$-$C_4$)alkyl-C$R_{20}$—C(O)—NH$_2$, wherein $R_{20}$ is hydrogen or ($C_1$-$C_4$)alkyl.

More preferably in formula (Ic), (Id), (Ie), (f), (Ig) and (Ih) at least two of $R_{201}$, $R_{202}$, $R_{203}$ and $R_{204}$ are ethyl, propyl or butyl and the remaining are methyl; or $R_{201}$ and $R_{202}$ or $R_{203}$ and $R_{204}$ together with the linking carbon atom form a $C_5$-$C_6$cycloalkyl radical and one of the remaining substituents is ethyl, propyl or butyl.

Most preferably X is CH$_3$CH-phenyl.

The above compounds and their preparation is described in GB 2342649.

Further suitable compounds are the 4-imino compounds of formula (III)

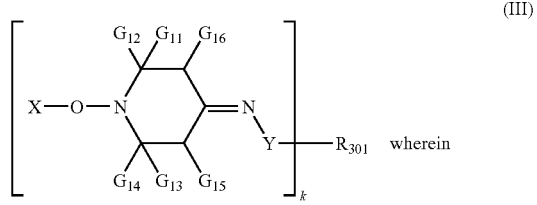

(III)

$G_{11}$, $G_{12}$, $G_{13}$ and $G_{14}$ are independently $C_1$-$C_4$alkyl or $G_{11}$ and $G_{12}$ together and $G_{13}$ and $G_{14}$ together, or $G_{11}$ and $G_{12}$ together or $G_{13}$ and $G_{14}$ together are pentamethylene;

$G_{15}$ and $G_{16}$ are each independently of the other hydrogen or $C_1$-$C_4$alkyl;

X is as defined above;

k is 1, 2, 3, or 4

Y is O, $NR_{302}$ or when n is 1 and $R_{301}$ represents alkyl or aryl Y is additionally a direct bond;

$R_{302}$ is H, $C_1$-$C_{18}$alkyl or phenyl;

if k is 1

$R_{30l}$ is H, straight or branched $C_1$-$C_{18}$alkyl, $C_3$-$C_{18}$alkenyl or $C_3$-$C_{18}$alkinyl, which may be unsubstituted or substituted, by one or more OH, $C_1$-$C_8$alkoxy, carboxy, $C_1$-$C_8$alkoxycarbonyl; $C_5$-$C_{12}$cycloalkyl or $C_5$-$C_{12}$cycloalkenyl;

phenyl, $C_7$-$C_9$-phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl;

—C(O)—$C_1$-$C_{36}$alkyl, or an acyl moiety of a α,β-unsaturated carboxylic acid having 3 to 5 carbon atoms or of an aromatic carboxylic acid having 7 to 15 carbon atoms;

—SO$_3$$^-$Q$^+$, —PO(O$^-$Q$^+$)$_2$, —P(O)(OR$_2$)$_2$, —SO$_2$—R$_2$, —CO—NH—R$_2$, —CONH$_2$, COOR$_2$, or Si(Me)$_3$, wherein Q$^+$ is H$^+$, ammonium or an alkali metal cation;

if k is 2

$R_{301}$ is $C_1$-$C_{18}$alkylene, $C_3$-$C_{18}$alkenylene or $C_3$-$C_{18}$alkinylene, which may be unsubstituted or substituted, by one or more OH, $C_1$-$C_8$alkoxy, carboxy, $C_1$-$C_8$alkoxycarbonyl; or xylylene; or $R_{301}$ is a bisacyl radical of an aliphatic dicarboxylic acid having 2 to 36 carbon atoms, or a cycloaliphatic or aromatic dicarboxylic acid having 8-14 carbon atoms;

if k is 3, $R_{301}$ is a trivalent radical of an aliphatic, cycloaliphatic or aromatic tricarboxylic acid; and if k is 4, $R_{301}$ is a tetravalent radical of an aliphatic, cycloaliphatic or aromatic tetracarboxylic acid.

Preferably $G_{16}$ is hydrogen and $G_{15}$ is hydrogen or $C_1$-$C_4$alkyl, in particular methyl, and $G_{11}$ and $G_{13}$ are methyl and $G_{12}$ and $G_{14}$ are ethyl or propyl or $G_{11}$ and $G_{12}$ are methyl and $G_{13}$ and $G_{14}$ are ethyl or propyl.

The 4 imino compounds of formula V can be prepared for example according to E. G. Rozantsev, A. V. Chudinov, V. D. Sholle.:Izv. Akad. Nauk. SSSR, Ser. Khim. (9), 2114 (1980), starting from the corresponding 4-oxonitroxide in a condensation reaction with hydroxylamine and subsequent reaction of the OH group. The compounds are described WO 02/100831.

Preference is given to compounds wherein the structural element of formula (II') is of formula A', B' or O',

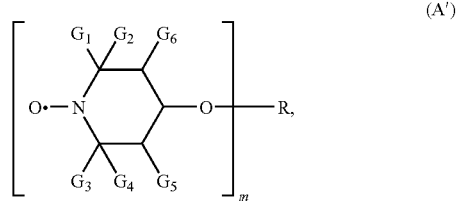

(A')

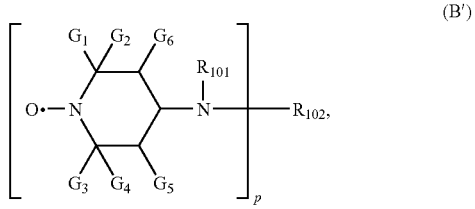

(B')

-continued

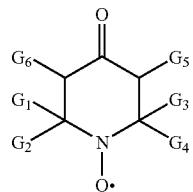
(O')

wherein m is 1,

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_{101}$ is $C_1$-$C_{12}$alkyl, $C_5$-$C_7$cycloalkyl, $C_7$-$C_8$ aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$—Z or of the formula —CO—Z or —CONH—Z wherein Z is hydrogen, methyl or phenyl;

$G_6$ is hydrogen and $G_5$ is hydrogen or $C_1$-$C_4$alkyl, $G_1$ and $G_3$ are methyl and $G_2$ and $G_4$ are ethyl or propyl or $G_1$ and $G_2$ are methyl and $G_3$ and $G_4$ are ethyl or propyl.

Also suitable are the compounds wherein the structural element

is of formula (III')

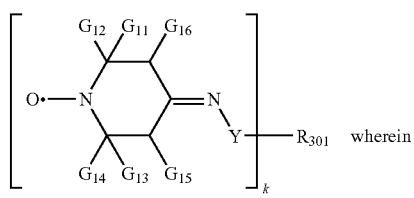
(III')

$G_{11}$, $G_{12}$, $G_{13}$ and $G_{14}$ are independently $C_1$-$C_4$alkyl or $G_{11}$ and $G_{12}$ together and $G_{13}$ and $G_{14}$ together, or $G_{11}$ and $G_{12}$ together or $G_{13}$ and $G_{14}$ together are pentamethylene;

$G_{15}$ and $G_{16}$ are each independently of the other hydrogen or $C_1$-$C_4$alkyl;

k is 1, 2, 3, or 4

Y is O, $NR_{302}$ or when n is 1 and $R_{301}$ represents alkyl or aryl Y is additionally a direct bond;

$R_{302}$ is H, $C_1$-$C_{18}$alkyl or phenyl;

if k is 1

$R_{301}$ is H, straight or branched $C_1$-$C_{18}$alkyl, $C_3$-$C_{18}$ alkenyl or $C_3$-$C_{18}$alkinyl, which may be unsubstituted or substituted, by one or more OH, $C_1$-$C_8$alkoxy, carboxy, $C_1$-$C_8$alkoxycarbonyl;

$C_5$-$C_{12}$cycloalkyl or $C_5$-$C_{12}$cycloalkenyl;

phenyl, $C_7$-$C_9$-phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl;

—C(O)—$C_1$-$C_{36}$alkyl, or an acyl moiety of a α,β-unsaturated carboxylic acid having 3 to 5 carbon atoms or of an aromatic carboxylic acid having 7 to 15 carbon atoms;

—$SO_3^-Q^+$, —$PO(O^-Q^+)_2$, —$P(O)(OR_2)_2$, —$SO_2$—$R_2$, —CO—NH—$R_2$, —$CONH_2$, $COOR_2$, or $Si(Me)_3$, wherein $Q^+$ is $H^+$, ammonium or an alkali metal cation;

if k is 2

$R_{301}$ is $C_1$-$C_{18}$alkylene, $C_3$-$C_{18}$alkenylene or $C_3$-$C_{18}$alkinylene, which may be unsubstituted or substituted, by one or more OH, $C_1$-$C_8$alkoxy, carboxy, $C_1$-$C_8$alkoxycarbonyl; or xylylene; or $R_{301}$ is a bisacyl radical of an aliphatic dicarboxylic acid having 2 to 36 carbon atoms, or a cycloaliphatic or aromatic dicarboxylic acid having 8-14 carbon atoms;

if k is 3, $R_{301}$ is a trivalent radical of an aliphatic, cycloaliphatic or aromatic tricarboxylic acid; and if k is 4, $R_{301}$ is a tetravalent radical of an aliphatic, cycloaliphatic or aromatic tetracarboxylic acid.

The alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkenyl with 3 to 18 carbon atoms is a linear or branched radical as for example propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl oder n-4-octadecenyl.

Preferred is alkenyl with 3 bis 12, particularly preferred with 3 to 6 carbon atoms.

Alkinyl with 3 to 18 is a linear or branched radical as for example propinyl (—$CH_2$—C≡CH), 2-butinyl, 3-butinyl, n-2-octinyl, oder n-2-octadecinyl. Preferred is alkinyl with 3 to 12, particularly preferred with 3 to 6 carbon atoms.

Examples for hydroxy substituted alkyl are hydroxy propyl, hydroxy butyl or hydroxy hexyl.

Examples for halogen substituted alkyl are dichloropropyl, monobromobutyl or trichlorohexyl.

$C_2$-$C_{18}$alkyl interrupted by at least one O atom is for example —$CH_2$—$CH_2$—O—$CH_2$—$CH_3$, —$CH_2$—$CH_2$—O—$CH_3$—or—$CH_2$—$CH_2$—O—$CH_2$—$CH_2$—$CH_2$—O—$CH_2$—$CH_3$—. It is preferably derived from polyethylene glycol. A general description is —$((CH_2)_a$—O$)_b$—H/$CH_3$, wherein a is a number from 1 to 6 and b is a number from 2 to 10.

$C_2$-$C_{18}$alkyl interrupted by at least one $NR_5$ group may be generally described as —$((CH_2)_a$—$NR_5)_b$—H/$CH_3$, wherein a, b and $R_5$ are as defined above.

$C_3$-$C_{12}$cycloalkyl is typically, cyclopropyl, cyclopentyl, methylcyclopentyl, dimethylcyclopentyl, cyclohexyl, methylcyclohexyl or trimethylcyclohexyl.

$C_6$-$C_{10}$ aryl is for example phenyl or naphthyl, but also comprised are $C_1$-$C_4$alkyl substituted phenyl, $C_1$-$C_4$alkoxy substituted phenyl, hydroxy, halogen or nitro substituted phenyl. Examples for alkyl substituted phenyl are ethylbenzene, toluene, xylene and its isomers, mesitylene or isopropylbenzene. Halogen substituted phenyl is for example dichlorobenzene or bromotoluene.

Alkoxy substituents are typically methoxy, ethoxy, propoxy or butoxy and their corresponding isomers.

$C_7$-$C_9$-phenylalkyl is benzyl, phenylethyl or phenylpropyl.

$C_6$-$C_{10}$heteroaryl is for example pyrrol, pyrazol, imidazol, 2, 4, dimethylpyrrol, 1-methylpyrrol, thiophene, furane, furfural, indol, cumarone, oxazol, thiazol, isoxazol, isothiazol, triazol, pyridine, α-picoline, pyridazine, pyrazine or pyrimidine.

If R is a monovalent radical of a carboxylic acid, it is, for example, an acetyl, propionyl, butyryl, valeroyl, caproyl, stearoyl, lauroyl, acryloyl, methacryloyl, benzoyl, cinnamoyl or α-(3,5-di-tert-butyl-4-hydroxyphenyl)propionyl radical.

$C_1$-$C_{18}$alkanoyl is for example, formyl, propionyl, butyryl, octanoyl, dodecanoyl but preferably acetyl and $C_3$-$C_5$alkenoyl is in particular acryloyl.

In particular polymerization process b1) is very suitable. When process b1) is used the nitroxylether according to the structures outlined above splits between the O—X bond. The fragment (E) in formula (I) corresponds then to the O—N fragment and the initiating fragment (In) corresponds to the C centered radical of the group X.

Particularly suitable nitroxylethers and nitroxyl radicals are those of formulae

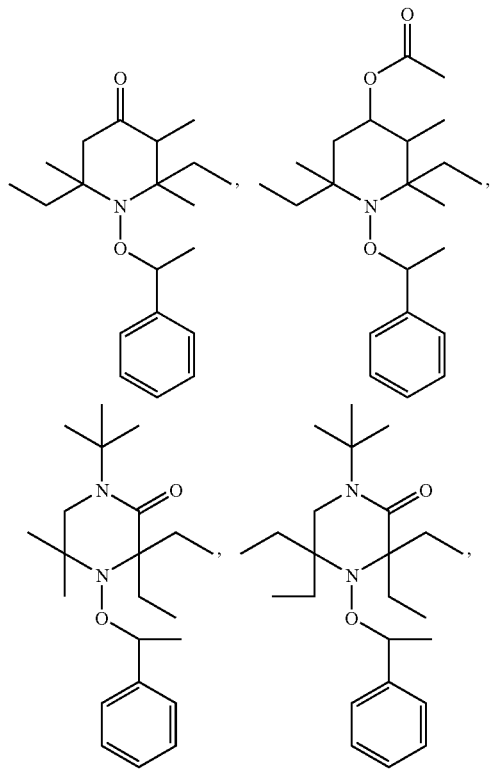

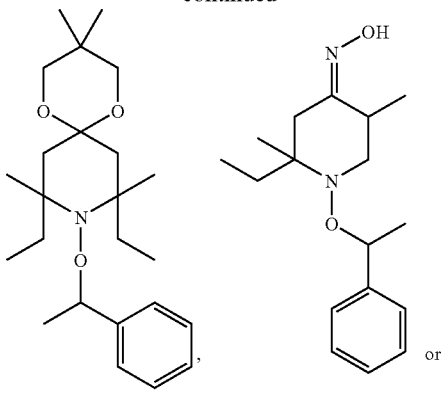

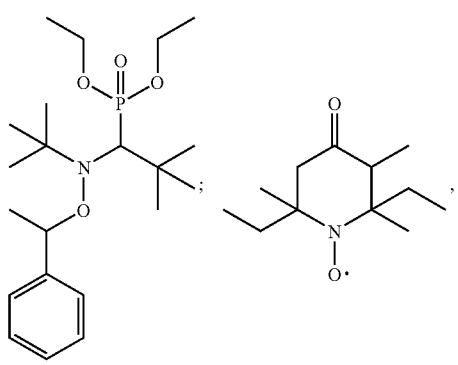

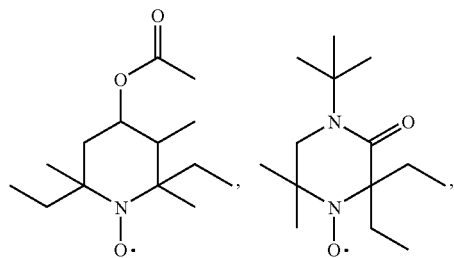

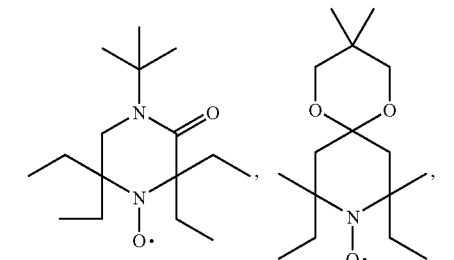

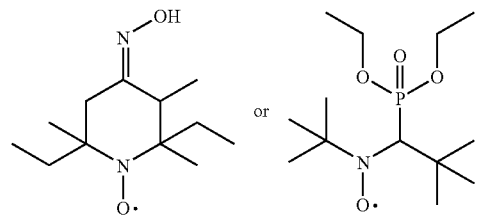

In a very specific embodiment of the invention, the polymeric or copolymeric levelling agent is prepared with a compound of formula (O1)

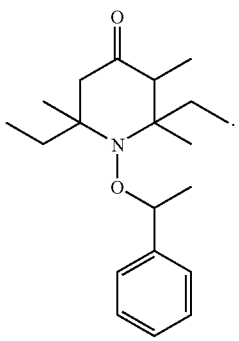

(O1)

In this case the initiating fragment (In) in formula (I) is

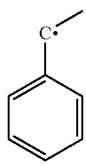

and the group (E) is

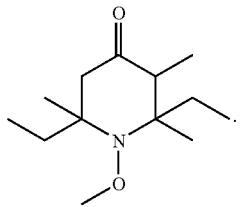

When the process according to route b2) is chosen, the initiating fragment (In) corresponds to the radical derived from the free radical initiator. The free radical initiator of route b2) is preferably an azo compound, a peroxide, perester or a hydroperoxide.

Specific preferred radical sources are 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dehydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononanoate, 2,5-dimethylhexane 2,5-dibenzoate, t-butyl peracetate, t-amyl perbenzoate, t-butyl perbenzoate, 2,2-bis(t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, α, α'-bis(t-butylperoxy isopropyl)benzene, 3,5-bis(t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydro peroxide.

The group E must not necessarily be a stable free nitroxyl radical, which is bound via the oxygen atom to the polymer or copolymer. It is also possible that it is a group, which results from a substitution or elimination reaction of the attached stable free nitroxyl radical.

For the introduction of another group at the chain end or to render the nitroxyl-terminated polymer non-reactive, several possibilities exist to remove or exchange the nitroxide (NO*). Some specific examples are given below.

The nitroxide chain end can e.g. be exchanged by the use of compounds that can generate radicals upon homolytic cleavage e.g. tetraphenylethane based products. Exchange of the nitroxide chain end is carried out by heating the polymer in the presence of e.g. a tetraphenyl ethane derivative up to a temperature were the equilibrium between the open and closed chain end is active. Exchange of the nitroxide and the homolytically cleaved tetraphenyl ethane derivative takes place. This is for example described by Beyou, E.; Jarroux, N.; Zydowicz, N.; Chaumont, P. Macromol. Chem. Phys. 2001, 202, 974-79 (Functional End-Group Exchange of Nitroxide- or Bromo-Terminated Polystyrene)

The nitroxide chain end can also be removed by the use of Zn/acetic acid under the formation of an OH-group at the chain end. This is described by Chessa, G.; Scrivanti, A.; Matteoli, U.; Castelvetro, V. Polymer 2001, 42, 9347-53 (Synthesis of three- and six-arms polystyrene via living/controlled free radical polymerisation)

A further possibility is the use of unsaturated compounds, which cannot be readily homo-polymerised via radical polymerisation. Examples are monomers like maleic anhydride, maleimide, n-substituted maleimides, maleic acid esters, fumaric acid esters, α-methylstyrene, dialkylfumarates, or non-activated alkenes like isobutene, cyclohexene, 1-octene or isomers, alkylallylethers, allylesters. Such unsaturated compounds are preferentially added to the NO*-terminated polymer after consumption and/or removal of the monomers, which are reactive in nitroxyl-mediated polymerization. The NO*-terminated polymer and the non-polymerisation reactive unsaturated compound are than heated to elevated temperatures e.g. 100-150° C. for a time period sufficient to render the polymer inactive towards further chain growth. Without being bound to any theory, it is believed, that by such a post-treatment with non-reactive monomers, all or most of the NO*-groups are split off from the polymer and one or only a few units of the non-reactive unsaturated compound are inserted at the polymer chain end. Specific examples for such a post-treatment functionalization is the reaction with maleic anhydride and malemides under the formation of a double bond as described by Harth, E.; Hawker, C. J.; Fan, W.; Waymouth, R. M. Macromolecules 2001, 34(12), 3856-62 (Chain End Functionalization in Nitroxide-Mediated "Living" Free Radical Polymerizations)

Yet another possibility is the use of compounds that can induce a fragmentation at the chained e.g. by using methacrylates in nitroxide mediated free radical polymerisation. The nitroxide chain end of an acrylic polymer can be removed by heating with e.g. an excess of methyl methacrylate at a temperature were the equilibrium of the open and closed chain end is active. Formation of a double bond at the chain end and the removal of the nitroxide can be observed, as described by Cheng, C.; Yang, N.-L. Polymer Preprints 2003, 41(1), 1010-11C. Burguiere, M.-A. Dourges, B. Charleux, J.-P. Vairon, Macromolecules, 1999, 32, 3883-3890.

A simple method for elimination of NO* from the polymer made by nitroxide mediated controlled free radical polymerisation is by heating to high temperatures after removal of the reactive monomer. This leads to a polymer, which is inactive for further nitroxyl-mediated polymerisation. Without being bound to theories, it is believed that by such thermal post-treatment the NO* groups eliminates or is exchanged from the polymer.

Examples for groups introduced by the various processes are —OH, —CR=CR$_2$, —O—C(O)—CR=CH$_2$.

Preferably the levelling agent, component b), has a polydispersity of between 1.0 and 2.0, more preferably between 1.1 and 1.5.

For example the levelling agent, component b), has a glass transition temperature between 20° C. and 200° C., in particular between 30° C. and 150° C.

In a preferred embodiment the levelling agent, component b), is composed of at least 30% of tert.-butylacrylate and/or tert.-butylmethacrylate, based on the weight of total monomers, in particular of more than 50% by weight.

For instance the levelling agent, component b), is a linear polymer or copolymer, i.e. in formula (I) n is 1.

Preferably in formula (I), component b), y is 1.

For example the levelling agent, component b), has a molecular weight of between 1000 to 100000, preferably between 3000 to 50000 g/mol (Dalton).

Preferred is a coating composition wherein the levelling agent, component b), is composed of at least 30%, more preferred of at least 50% by weight of tert.-butylacrylate and/or tert.-butylmethacrylate, and 0.5 to 50%, more preferred of 1 to 20% of a functional monomer which is selected from the group consisting of acrylic acid, methacrylic acid, acrylic acid ($C_1$-$C_6$)hydroxyalkyl esters, methacrylic acid ($C_1$-$C_6$)hydroxyalkyl esters, acrylic acid ($C_1$-$C_6$)alkyl esters and methacrylic acid ($C_1$-$C_6$)alkyl esters which are substituted by amino, ($C_1$-$C_6$)alkylamino, ($C_1$-$C_6$)dialkylamino, epoxy, fluoro, perfluoro or siloxane groups.

In a specific embodiment of the invention the levelling agent, component b), is composed of at least 50% by weight of tert.-butylacrylate and/or tert.-butylmethacrylate and is a solid at room temperature.

Preferably the levelling agent, component b), is present in an amount of 0.1 to 15%, more preferred 0.1 to 10% and most preferred 0.1 to 3% by weight, based on the weight of the film forming binder resin or resins, component a).

In an other preferred embodiment, the levelling agent, component b) comprises at least two different monomers M and the sequence structure within the structural element $(M)_x$ is a diblock-, multiblock- or tapered blocklike arrangement of the different monomers.

Still in another preferred embodiment, the levelling agent, component b) comprises at least one multifunctional monomer by which the polymer chain within the structural element $(M)_x$ results in a branched polymer chain structure and y>1. Typical multifunctional monomers are mentioned in the context of radiation curable coatings.

The multifunctional monomer comprises compounds with at least two unsaturated double bonds, which are capable to copolymerize during the controlled free radical polymerization. Depending on reactivity of the multifunctional monomer and used amount, this leads to various degrees of branching of the polymer chains $(M)_x$ grown from the initiator fragment In.

Typical examples of multifunctional monomers are ethylene glycol diacrylate, ethylene glycol dimethacrylate, 1,4-butandiol diacrylate, 1,4-butandiol dimethacrylate, trimethylopropane triacrylate, trimethylopropane trimethacrylate, allylmethacrylate, 1,4-divinylbenzene, 1,6-hexanediol diacrylate, tripropylene glycol diacrylate, ethoxylated trimethylolpropane triacrylate, ethoxylated Bisphenol-A diacrylate.

The coating composition may contain additional additives, such as light stabilizers, heat stabilizers, pigments and fillers. Examples for additional additives are given below.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctyl-thiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2, 2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis [6-α-methylbenzyl)-4-nonylphenol], 2,2'-methylenebis[6-(α,α-dimethylbenzyl)-4-nonylphenol], 4,4'-methyl-lenebis (2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra (5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxy-anilino)-1,3,5-triazine, 2-octylmercapto-4,6-bis(3,5-di-tert-butyl-4-hydroxyanilino)-1,3,5-tri-azine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)iso-cyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or poly-hydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)ox-amide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)ox-amide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxy-phenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenyl-amine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis (4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetra-methyl-4,4'-diaminodiphenylmethane, 1,2-bis[(2-methylphenyl)amino]ethane, 1,2-bis(phenyl-amino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyidiphenyl-amines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'- tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)benzo-triazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)carbonylethyl]-2'-hydroxy-phenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$–]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-di-chloro-1,3,5-triazine, tris(2,2,6,6-tetramethyl-4-piperidyl)nitrilotriacetate, tetrakis(2,2,6,6-tetra-methyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethyl-piperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4,5]decane-2,4-dione, bis(1-octyl-oxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4,5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-tri-chloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-di-aza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos®168, Ciba-Geigy), tris(nonylphenyl) phosphite,

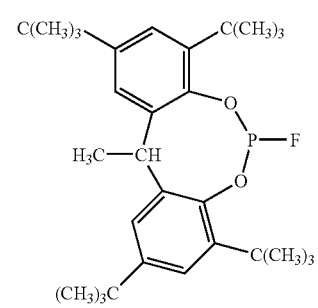
(A)

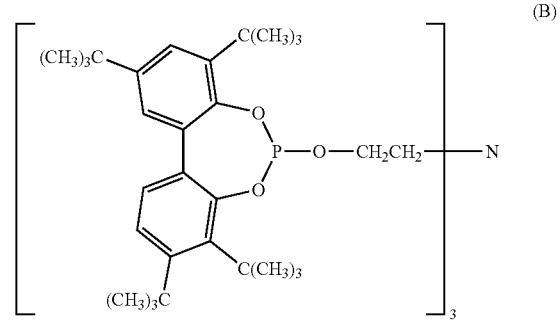
(B)

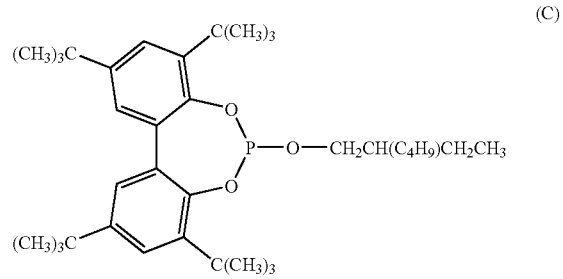
(C)

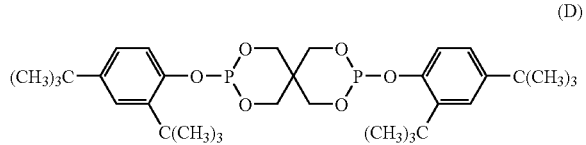
(D)

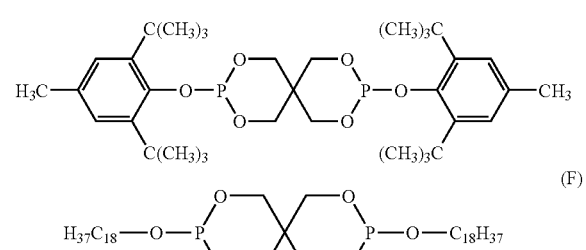
(E)

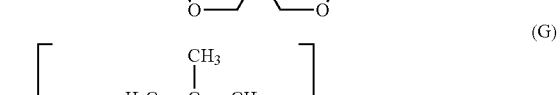
(F)

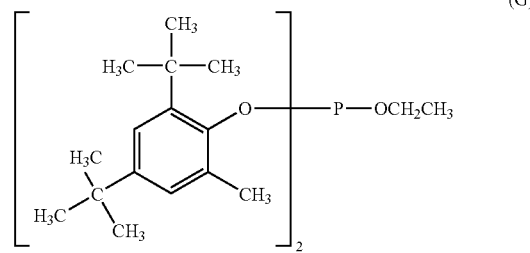
(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxy-ylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptyinitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-hepta-decylnitrone, N-octadecyl-alpha-hexadecylnitrone, nitrone derived from N,N-dialkylhydroxyl-amine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticizers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphel)-5,7-di-tert-butylbenzofuran-2-one.

A further aspect of the invention is a process for improving the levelling of a coating composition as described above, which process comprises the steps applying the coating composition to a substrate and exposing it to thermal energy or electromagnetic radiation in order to obtain a homogenous solid coating.

Yet another aspect of the invention is the use of a polymer or copolymer of formula (I), In-[$(M)_x$-$(E)_y$]$_n$ (I) obtained by nitroxyl mediated controlled free radical polymerisation wherein In is the initiator fragment starting the polymerisation reaction;

M is at least one monomer selected from the group consisting of acrylic acid, methacrylic acid, acrylic acid ($C_1$-$C_{22}$) alkyl esters, acrylic acid ($C_1$-$C_{22}$)hydroxyalkyl esters, methacrylic acid ($C_1$-$C_{22}$)alkyl esters, methacrylic acid ($C_1$-$C_{22}$)hydroxyalkyl esters, acrylic acid ($C_1$-$C_{22}$)alkyl esters or methacrylic acid ($C_1$-$C_{22}$)alkyl esters which are substituted by amino, ($C_1$-$C_{22}$)alkylamino, ($C_1$-$C_{22}$)dialkylamino, —$SO_3H$, epoxy, fluoro, perfluoro or siloxane groups, styrene, substituted styrene, acrylamide and methacrylamide, N-mono($C_1$-$C_{22}$)alkyl acrylamide, N,N-di($C_1$-$C_{22}$)alkyl acrylamide, and a multifunctional monomer with two or more ethylenically unsaturated bonds;

provided that the amount of unsubstituted acrylic acid ($C_1$-$C_{22}$)alkyl esters or/and methacrylic acid ($C_1$-$C_{22}$)alkyl esters is more than 30% by weight based on the weight of the total monomer mixture;

E is a group bearing at least one stable free nitroxyl radical, which is bound via the oxygen atom to the polymer or copolymer; or a group, which results from a substitution or elimination reaction of the attached stable free nitroxyl radical;

x is the total number of monomer units, which is a number between 5 and 5000;

y is a number 1 or greater than 1 indicating the average number of end groups E attached to the monomer sequence $(M)_x$;

n is a number from 1 to 20;

as a levelling agent for a coating composition comprising a1) a physically drying film forming binder resin or resins;

a2) a thermally cross linking film forming binder resin or binder resins;

a3) a radiation curable film forming binder resin or binder resins;

a4) an autoxidatively drying film forming binder resin or resins; or a5) a combination of binder resins with at least two different crosslinking mechanisms selected from a1), a2), a3) or a4).

Exposing the above coating composition to thermal energy in order to obtain a homogenous solid coating means preferably heating it to a temperature between 60° C. and 180° C., more preferred between 80° C. and 150° C. In the case of thermosetting powder coatings the preferred temperature range is between 150° C. and 200° C.

Exposing the coating to electromagnetic radiation means preferably exposure to UV radiation to effect curing of the coating.

It is also possible to combine both exposures; such as, for example, firstly curing the composition with UV radiation and secondly applying a thermal treatment to effect a post cure.

Curing time may be only seconds in the case of radiation curable coatings, between 1 minute and 60 minutes in case of thermosetting coatings or in the range of hours in case of autoxidatively drying coatings.

A further aspect of the invention is a coating composition comprising a1) a physically drying film forming binder resin or resins;
a2) a thermally cross linking film forming binder resin or binder resins;
a3) a radiation curable film forming binder resin or binder resins;
a4) an autoxidatively drying film forming binder resin or resins; or
a5) a combination of binder resins with at least two different crosslinking mechanisms selected from a1), a2), a3) or a4);
b) a polymer or copolymer levelling agent of formula (X), prepared by atom transfer radical polymerisation In-[(M)$_x$-(E)$_y$]$_n$ (X)

wherein

In is the initiator fragment starting the polymerisation reaction;

M is at least one monomer selected from the group consisting of acrylic acid, methacrylic acid, acrylic acid ($C_1$-$C_{22}$) alkyl esters, acrylic acid ($C_1$-$C_{22}$)hydroxyalkyl esters, methacrylic acid ($C_1$-$C_{22}$)alkyl esters, methacrylic acid ($C_1$-$C_{22}$)hydroxyalkyl esters, acrylic acid ($C_1$-$C_{22}$)alkyl esters or methacrylic acid ($C_1$-$C_{22}$)alkyl esters which are substituted by amino, ($C_1$-$C_{22}$)alkylamino, ($C_1$-$C_{22}$)dialkylamino, —$SO_3H$, epoxy, fluoro, perfluoro or siloxane groups, styrene, substituted styrene, acrylamide and methacrylamide, N-mono($C_1$-$C_{22}$)alkyl acrylamide, N,N-di ($C_1$-$C_{22}$)alkyl acrylamide, and a multifunctional monomer with two or more ethylenically unsaturated bonds;

with the proviso that the amount of tert.-butylacrylate is more than 30% by weight, based on the weight of the total monomer mixture;

E is Cl, Br or a group introduced by nucleophilic substitution of Cl or Br;

x is the total number of monomer units, which is a number between 5 and 5000;

y is a number 1 or greater than 1 indicating the average number of end groups E attached to the monomer sequence (M)$_x$;

n is a number from 1 to 20; and c) optionally water or/and one or more organic solvents.

Atom transfer radical polymerization (ATRP) is, for example, described in WO 96/30421. WO 96/30421 discloses a controlled or "living" polymerization process of ethylenically unsaturated monomers such as styrene or (meth)acrylates by employing the ATRP method. According to this method initiators are employed which generate a radical atom such as .Cl, in the presence of a redox system of transition metals of different oxidation states, e.g. Cu(I) and Cu(II), providing "living" or controlled radical polymerization.

A suitable initiating compound is of formula (XI),

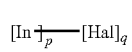
(XI)

with a radically transferable atom or group .Hal as is described in WO 96/30421 and WO 98/01480. A preferred radically transferable atom or group .Hal is .Cl or .Br, which is cleaved as a radical from the initiator molecule.

[In] represents the polymerization initiator fragment of a polymerization initiator of formula (XI),

capable of initiating polymerization of monomers or oligomers which polymerization initiator is selected from the group consisting of $C_1$-$C_8$-alkyl halides, $C_6$-$C_{15}$-aralkylhalides, $C_2$-$C_8$α-haloalkyl esters, arene sulfonyl chlorides, haloalkanenitriles, α-haloacrylates and halolactones, and p and q represent one.

Specific initiators are selected from the group consisting of α,α'-dichloro- or α,α'-dibromoxylene, p-toluenesulfonyl-chloride (PTS), hexakis-(α-chloro- or α-bromomethyl)-benzene, 2-chloro- or 2-bromopropionic acid, 2-chloro- or 2-bromoisobutyric acid, 1-phenethyl chloride or bromide, methyl or ethyl 2-chloro- or 2-bromopropionate, ethyl-2-bromo- or ethyl-2-chloroisobutyrate, chloro- or bromoacetonitrile, 2-chloro- or 2-bromopropionitrile, α-bromo-benzacetonitrile and α-bromo-γ-butyrolactone (=2-bromo-dihydro-2(3H)-furanone). The transition metal in the oxidizable transition metal complex catalyst salt used in the process of the invention is present as an oxidizable complex ion in the lower oxidation state of a redox system. Preferred examples of such redox systems are selected from the group consisting of Group V(B), VI(B), VII(B), VIII IB and IIB elements, such as $Cu^+/Cu^{2+}$, $Cu^0Cu^+$, $Fe^0/Fe^{2+}$, $Fe^{2+}/Fe^{3+}$, $R^{2+}/R^{3+}$, $R^{3+}/R^{4+}$, $Os^{2+}/Os^{3+}$, $V^{n+}N^{(n+1)+}$, $Cr^{2+}/Cr^{3+}$, $Co^+/Co^{2+}$, $Co^{2+}/Co^{3+}$, $Ni^0/Ni^+$, $Ni^+/Ni^{2+}$, $Ni^{2+}/Ni^{3+}$, $Mn^0/Mn^{2+}$, $Mn^{2+}/Mn^{3+}$, $Mn^{3+}/Mn^{4+}$ or $Zn^+/Zn^{2+}$.

The ionic charges are counterbalanced by anionic ligands commonly known in complex chemistry of transition metals, such hydride ions (H$^-$) or anions derived from inorganic or organic acids, examples being halides, e.g. F$^-$, Cl$^-$, Br$^-$ or I$^-$, fluoro complexes of the type $BF_4^-$, $PF_6^-$, $SbF_6^-$ or $AsF_6^-$, anions of oxygen acids, alcoholates or acetylides or anions of cyclopentadiene.

Anions of oxygen acids are, for example, sulfate, phosphate, perchlorate, perbromate, periodate, antimonate, arsenate, nitrate, carbonate, the anion of a $C_1$-$C_8$-carboxylic acid, such as formate, acetate, propionate, butyrate, benzoate, phenylacetate, mono-, di- or trichloro- or -fluoroacetate, sulfonates, for example methylsulfonate, ethylsulfonate, propylsulfonate, butylsulfonate, trifluoromethylsulfonate (triflate), unsubstituted or $C_1$-$C_4$alkyl-, $C_1$-$C_4$alkoxy- or halo-, especially fluoro-, chloro- or bromo-substituted phenylsulfonate or benzylsulfonate, for example tosylate, mesylate, brosylate, p-methoxy- or p-ethoxyphenylsulfonate, pentafluorophenylsulfonate or 2,4,6-triisopropylsulfonate, phosphonates, for example methylphosphonate, ethylphosphonate, propylphosphonate, butylphosphonate, phenylphosphonate, p-methylphenylphosphonate or benzylphosphonate, carboxylates derived from a $C_1$-$C_8$-carboxylic acid, for example formate, acetate, propionate, butyrate, benzoate, phenylacetate, mono-, di- or trichloro- or -fluoroacetate, and also $C_1$-$C_{12}$-alcoholates, such as straight chain or branched $C_1$-$C_{12}$-alcoholates, e.g. methanolate or ethanolate.

Anionic ligands and neutral may also be present up to the preferred coordination number of the complex cation, especially four, five or six. Additional negative charges are counterbalanced by cations, especially monovalent cations such as Na$^+$, K$^+$, $NH_4^+$ or ($C_1$-$C_4$ alkyl)$_4$N$^+$.

Suitable neutral ligands are inorganic or organic neutral ligands commonly known in complex chemistry of transition metals. They coordinate to the metal ion through a (σ-, π-, μ-, η-type bonding or any combinations thereof up to the preferred coordination number of the complex cation. Suitable inorganic ligands are selected from the group consisting of aquo ($H_2O$), amino, nitrogen, carbon monoxide and nitrosyl. Suitable organic ligands are selected from the group consisting of phosphines, e.g. $(C_6H_5)_3P$, $(i-C_3H_7)_3P$, $(C_5H_9)_3P$ or $(C_6H_{11})_3P$, di-, tri-, tetra- and hydroxyamines, such as ethylenediamine, ethylenediaminotetraacetate (EDTA), N,N-Dimethyl-N',N'-bis(2-dimethylaminoethyl)-ethylenediamine ($Me_6TREN$), catechol, N,N'-dimethyl-1,2-benzenediamine, 2-(methylamino)phenol, 3-(methylamino)-2-butanol or N,N'-bis(1,1-dimethylethyl)-1,2-ethanediamine, N,N,N',N'',N''-pentamethyldiethyltriamine (PMD-ETA), $C_1$-$C_8$-glycols or glycerides, e.g. ethylene or propylene glycol or derivatives thereof, e.g. di-, tri- or tetraglyme, and monodentate or bidentate heterocyclic $e^-$ donor ligands.

Heterocyclic $e^-$ donor ligands are derived, for example, from unsubstituted or substituted heteroarenes from the group consisting of furan, thiophene, pyrrole, pyridine, bis-pyridine, picolylimine, g-pyran, g-thiopyran, phenanthroline, pyrimidine, bis-pyrimidine, pyrazine, indole, coumarone, thionaphthene, carbazole, dibenzofuran, dibenzothiophene, pyrazole, imidazole, benzimidazole, oxazole, thiazole, bis-thiazole, isoxazole, isothiazole, quinoline, bis-quinoline, iso-quinoline, bis-isoquinoline, acridine, chromene, phenazine, phenoxazine, phenothiazine, triazine, thianthrene, purine, bis-imidazole and bis-oxazole.

The oxidizable transition metal complex catalyst can be formed in a separate preliminary reaction step from its ligands or is preferably formed in-situ from its transition metal salt, e.g. Cu(I)Cl, which is then converted to the complex compound by addition of compounds corresponding to the ligands present in the complex catalyst, e.g. by addition of ethylenediamine, EDTA, $Me_6TREN$ or PMDETA.

Preferably the oxidizable transition metal in the transition metal complex salt is present as a transition metal complex ion in the lower oxidation state of a redox system.

More preferably the transition metal complex ion is a Cu(I) complex ion in the Cu(I)/Cu(II) system.

The initiator of formula (XI),

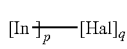
(XI)

and the oxidizable transition metal are for example present in an amount of 1:10 to 1:100, relative to the monomers. The total amount of oxidizable transition metal to initiator of formula (III) is for example from 0.05:1 to 2:1, in particular from 0.2:1 to 0.5:1. All ratios are weight ratios.

The preparation of comb copolymers by the ATRP method is for example described in WO 01/51534.

The chlorine or bromine atom bound to the polymer end when ATRP technique is used may be removed and/or substituted by functional groups, such as —ON(R)(R) groups, $NH_2$, —N(R)(R), OH or —O—C(O)—CR=$CH_2$. Examples for such substitutions are given in WO 01/51534, WO 00/18807, WO 93/43719 or WO 98/40415.

Yet another aspect of the invention is the use of poly-tert.-butyl acrylate or poly-tert.butylmethacrylate as a levelling agent in powder coating compositions.

The definitions and preferences given for the coating composition above apply also for the other aspects of the invention.

The following examples illustrate the invention.

EXAMPLES A

Polymerisation of the Levelling Agents

Abbreviations Used:

PD=polydispersity

GPC=gel permeation chromatography

PS-Standard=polystyrene standard

PMA=propoxymethyl acetate

THF=tetrahydrofurane

DEGDA=diethyleneglycol diacrylate

Zonyl-TM=2-(perfluoroalkyl)ethyl methacrylate

DMAEMA=dimethylaminoethyl methacrylate

PMDETA=N,N,N',N''-pentamethylenediethylene triamine

Example 1A

Synthesis of Linear High Molecular Weight Poly(n-BA). Polymerisation with Compound O1

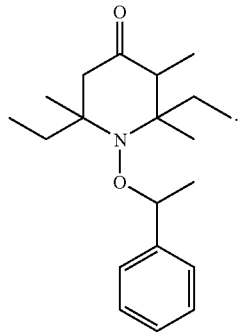

Compound O1 is prepared according to example 24 of GB 2335190

In a 3-necked 250 mL round bottom flask with magnetic stirring bar, thermometer, cooler and septum, 80.0 g n-butylacrylate (n-BA, 128.17 g/mol), 0.4 g of compound O1 (317.48 g/mol) and 2.5 g of PMA are mixed together, degassed 3 times with $N_2$/vacuum and polymerised under $N_2$ for 6 h at 145° C. Residual monomers and solvent are distilled off at 120° C. and 7 mbar. Yield: 39%; GPC (THF, PS-Standard, Mn=19500 g/mol; PD=1.38), viscous liquid.

Example 2A

Synthesis of Linear High Molecular Weight Poly(t-BMA-co-n-BA)

In a 3-necked 50 mL round bottom flask with magnetic stirring bar, thermometer, cooler and septum, 19.0 g t-butylmethacrylate (t-BMA, 142.2 g/mol), 4.3 g n-butylacrylate (n-BA, 128.17 g/mol), 0.5 g compound O1 (317.48 g/mol) and 23.3 g PMA are mixed together, degassed 3 times with $N_2$/vacuum and polymerised under $N_2$ for 7 h at 120° C. Residual monomers are distilled off at 120° C. and 7 mbar. Yield 49%, GPC (THF, PS-Standard: Mn=8000 g/mol, PD=1.62), solid. Subsequently the sample is freeze-dried from 30 w % in dioxane to obtain a free flowing powder.

Example 3A

Synthesis of Linear High Molecular Weight Poly(t-BA)

In a 3-necked 50 mL round bottom flask with magnetic stirring bar, dropping funnel, cooler and septum, 25.6 g tert-butylacrylat (t-BA, 128.17 g/mol), 1.9 g compound O1 (317.48 g/mol) and 20 g PMA are mixed together, three times degassed with $N_2$/vacuum and polymerised under $N_2$ for 1 h at 145° C. 51.9 g tert.-butylacrylate are added to the mixture and polymerisation is continued for additional 6 h at 120-145° C. Residual monomers are distilled off at 120-145° C. and 7 mbar. Yield: 75%, GPC (THF, PS-Standard, Mn=8600 g/mol, PD=1.28), solid.

Example 4A

Synthesis of Star-Branched High Molecular Weight Poly(n-BA)

In a 3-necked 100 mL round bottom flask with magnetic stirring bar, thermometer, cooler and septum 2.7 g diethyleneglycol diacrylate (DEGDA, 214.22 g/mol), 0.2 g compound O1 (317.48 g/mol) and 55 g PMA are added, three times degassed with $N_2$/vacuum and polymerised for 6 h at 145° C. under $N_2$. The solvent and residual diacrylate is distilled off under reduced pressure. Yield 69%. 38.6 g of n-butylacrylate (n-BA, 128.17 g/mol) and 40 g of PMA are added, three times degassed with $N_2$/vacuum and polymerised for 6 h at 145° C. Residual monomers are distilled off at 120° C. and 7 mbar. Yield 17%, GPC (THF, PS-Standard, Mn=14200, PD=2.83), viscous liquid.

A test sample is prepared by freeze drying a masterbatch 30 w % in the binder system using dioxane.

Example 5A

Synthesis of Linear High Molecular Weight Poly(t-BA-co-Zonyl-TM)

In a 3-necked 250 mL round bottom flask with magnetic stirring bar, dropping funnel, cooler and septum 12.8 g t-butylacrylate (t-BA, 128.17 g/mol), 2.8 g of Zonyl-TM (534 g/mol), 0.95 g compound O1 (317.48 g/mol) and 12 g of PMA are added, three times degassed with $N_2$/vacuum and polymerised for 1 h at 145° C. under $N_2$. A mixture of 25.65 g t-butylacrylate and 5.63 g of Zonyl-TM is added slowly through the dropping funnel to the reaction mixture. The reaction is continued for additional 12 h at 145° C. under $N_2$. Residual monomers and solvents are distilled off at 120-145° C. and 7 mbar. Yield: 58%, GPC (THF, PS-Standard, Mn=7400 g/mol, PD=1.34), solid.

Example 6A

Synthesis of Linear High Molecular Weight Poly(t-BA-co-n-BA-co-t-BMA)

In a 3-necked 250 mL round bottom flask with magnetic stirring bar, dropping funnel, cooler and septum 3.0 g n-butylacrylate (n-BA, 128.17 g/mol), 15.0 g t-butylacrylate (t-BA, 128.17 g/mol), 13.3 g t-butylmethacrylate (t-BMA, 142.2 g/mol), 2.2 g compound O1 (317.48 g/mol) and 24 g of PMA are added, three times degassed with $N_2$/vacuum and polymerised for 1 h at 145° C. under $N_2$. A mixture of 30.06 g t-butylacrylate, 6.01 g n-butylacrylate and 26.7 g t-butylmethacrylate is added slowly with the dropping funnel to the reaction mixture. The reaction is continued for additional 6 h at 145° C. under $N_2$. Residual monomers and solvents are distilled off at 120-145° C. and 7 mbar. Yield 58%, GPC (THF, PS-Standard, Mn=7000 g/mol, PD=1.59), solid.

Example 7A

Synthesis of Linear High Molecular Weight Poly(t-BA-co-t-BMA)

In a 3-necked 250 mL round bottom flask with magnetic stirring bar, cooler and septum 32.04 g t-butylacrylate (t-BA, 128.17 g/mol), 35.55 g t-butylmethacrylate (t-BMA, 128.17 g/mol), 1.59 g compound O1 (317.48 g/mol) and 20 g of PMA are added, three times degassed with $N_2$/vacuum and polymerised for 7 h at 135° C. under $N_2$. Residual monomers and solvents are distilled off at 120-145° C. and 7 mbar. Yield 68%, GPC (THF, PS-Standard, Mn=8800 g/mol, PD=1.40), solid.

Example 8A

Synthesis of Linear High Molecular Weight Poly(y-BA-co-t-BMA)

In a 3-necked 500 mL round bottom flask with magnetic stirring bar, cooler, dosage pump and septum 63.3 g t-butylacrylate (t-BA, 128.17 g/mol), 3.7 g t-butylmethacrylate (t-BMA, 142.2 g/mol), 4.95 g compound O1 (317.48 g/mol) and 51.5 g of PMA are added, three times degassed with $N_2$/vacuum and polymerised at slight reflux (120-130° C.) under $N_2$ till a conversion of around 40% is reached. A mixture of 7.4 g t-butylmethacrylate and 126.7 g t-butylacrylate is added to the reaction vessel by a dosage pump (1 g/min). The reaction is continued for additional 33 h under slight reflux and $N_2$. Residual monomers and solvents are distilled off at 120-145° C. and 7 mbar. Yield 53%, GPC (THF, PS-Standard, Mn=6300 g/mol, PD=1.41), solid.

Example 9A

Synthesis of Linear High Molecular Weight Poly(y-BA-co-DMAEMA)

In a 3-necked 250 mL round bottom flask with magnetic stirring bar, cooler and septum 38.45 g t-butylacrylate (t-BA, 128.17 g/mol), 2.51 g dimethylaminoethylmethacrylate (DMAEMA, 157.21 g/mol), 0.95 g compound O1 (317.48 g/mol) and 10.0 g of PMA are added, three times degassed with $N_2$/vacuum and polymerised at 135° C. under $N_2$ for 7 h. Residual monomers and solvents are distilled off at 120-145° C. and 7 mbar. Yield 60%, GPC (THF, PS-Standard, Mn=8500 g/mol, PD=1.34), solid.

Example 10A

Synthesis of Linear High Molecular Weight Poly(t-BA) with Bromine Endgroup

Feed:

128.2 g (1 mol) tert-butyl acrylate (t-BA, Fluka, purum)

2.39 g (14.3 mmol) methyl-2-bromopropionate (MBP, Fluka, purum)

0.82 g (5.7 mmol) Cu(I)Br (Fluka, purum, washed with acetic acid and dried)

0.064 g (0.29 mmol) Cu(II)Br$_2$ (Fluka, purum)

0.99 g (5.71 mmol) PMDETA (Fluka, purum)

36.3 ml acetone (Fluka, puriss p.a.)

Cu(I)Br and Cu(II)Br$_2$ is added into a 350 ml 3-necked reaction vessel with mechanical stirring and inlet/outlet for N$_2$ and vacuum. The vessel is evacuated and rinsed with N$_2$ 3 times followed by the addition of the monomer t-BA in acetone. The reaction mixture is again evacuated and rinsed with N$_2$ 4 times and homogenized by mechanical stirring. The ligand precursor PMDETA is now added with a syringe through a septum, homogenized and the initiator MBP is added. After homogenization, the mixture is heated under stirring to 60° C. The conversion is monitored by $^1$H-NMR: 18% after 1.5 h, 81% after 19 h, 88% after 26 h. The reaction mixture is cooled to room temperature, diluted with 150 ml ethylacetate and stirred over 2 portions of 70 g Al$_2$O$_3$ for 30 min. The mixture is filtered and dried in vacuo (p<0.1 mbar) at 90° C. during 1 h. Yield: 103 g.

Analytical Data:

GPC (THF, PS-standards): M$_n$: 7750, M$_w$: 9320, PDI=1.20 (M$_n$(calc.): 8050.

DSC (10° C./min): T$_g$=39° C.

TGA (10° C./min): Weight loss: 44% at T=170-220° C.

Solids tester: 13% weight loss when put for 10 min at 200° C.

Example 11A

Synthesis of Linear High Molecular Weight Poly(t-BA) with Morpholine Endgroup

Feed:

50.0 g (6.2 mmol endgroups) poly(tert-butyl acrylate) (from Ex. 10A)

5.4 g (62 mmol) morpholine (Fluka, puriss. p.a.)

50 ml toluene

The polymer is added into a 350 ml 3-necked reaction vessel with mechanical stirring and inlet/outlet for N$_2$ and vacuum. The vessel is evacuated and rinsed with N$_2$ 3 times followed by the addition of morpholine. The reaction mixture is heated on an oil bath preheated to 130° C. As soon as the temperature of the reaction mixture reached 100° C. mechanical stirring is started. The mixture is heated for 4 h at 1300° C., cooled down to 90° C. and 50 ml toluene added. After cooling down to R.T. the reaction mixture is filtered and dried in vacuo (p<0.1 mbar) at 90° C. during 1 h. Yield: 47.7 g.

Analytical Data:

GPC (THF, PS-standards): M$_n$: 5950, M$_w$: 8075, PD=1.36.

N-content (Kjeldahl analysis): 0.18% (calc.: 0.17%).

TGA (1° C./min): Weight loss: 47% at T=220-250° C.

Solids tester: 0.6% weight loss when put for 10 min at 200° C.

Example 12A

Synthesis of Linear High Molecular Weight Poly(t-BA)

In a 3-necked 50 mL round bottom flask with magnetic stirring bar, dropping funnel, cooler and septum, 25.6 g tert-butylacrylat (t-BA, 128.17 g/mol), 1.9 g compound O1 (317.48 g/mol) and 20 g PMA are mixed together, three times degassed with N$_2$/vacuum and polymerised under N$_2$ for 1 h under slight reflux. 51.9 g are dosed to the mixture and polymerisation is continued for additional 6 h at 120-130° C. Residual monomers are distilled off at 120-145° C. and 7 mbar. Yield: 45%, GPC (THF, PS-Standard, Mn=6400 g/mol, PD=1.32), solid.

Example 13A

Synthesis of Linear High Molecular Weight Poly(t-BA-co-DMAEMA)

In a 3-necked 250 mL round bottom flask with magnetic stirring bar, cooler and septum 38.45 g t-butylacrylate (t-BA, 128.17 g/mol), 0.95 g compound O1 (317.48 g/mol) and 10.0 g of PMA are added, three times degassed with N$_2$/vacuum and polymerised at 135° C. under N$_2$ for 6 h. 2.51 g dimethylaminoethylmethacrylate (DMAEMA, 157.21 g/mol) is added to the flask and reacted for an additional hour at 145° C. Residual monomers and solvents are distilled off at 120-145° C. and 7 mbar. Yield 57%, GPC (THF, PS-Standard, Mn=7900 g/mol, PD=1.29), solid.

Example 14A

Synthesis of Poly(t-BA-b-StearylA)

In a 3-necked 500 mL round bottom flask with magnetic stirring bar, dropping funnel, cooler and septum, 24.0 g tert-butylacrylat (t-BA, 128.17 g/mol), 7.2 g octadecylacrylate (ODA, 324.55 g/mol), 2.7 g compound O1 (317.48 g/mol) and 25 g ethylhexylacetate are mixed together, three times degassed with N$_2$/vacuum and polymerised under N$_2$ for 1 h under slight reflux. 56 g of t-BA and 18.11 g of ODA are dosed to the mixture and polymerisation is continued for additional 6 h at 135° C. Residual monomers are distilled off at 120-145° C. and 7 mbar. Yield: 65%, GPC (THF, PS-Standard, Mn=8600 g/mol, PD=1.35), solid.

Example 15A

Synthesis of Poly(t-BA-b-BehenylA)

In a 3-necked 500 mL round bottom flask with magnetic stirring bar, dropping funnel, cooler and septum, 34.61 g tert-butylacrylat (t-BA, 128.17 g/mol), 11.42 g behenylacrylate (BhA, 324.55 g/mol), 3.85 g compound O1 (317.48 g/mol) and 40 g ethylhexylacetate are mixed together, three times degassed with N$_2$/vacuum and polymerised under N$_2$ for 1 h under slight reflux. 80.74 g of t-BA and 26.64 g of BhA are dosed to the mixture and polymerisation is continued for additional 6 h at 135° C. Residual monomers are distilled off at 120-145° C. and 7 mbar. Addition of 0.3 g t-butylperoctoate and heating for 4 h at 90° C. Yield: 49%, GPC (THF, PS-Standard, Mn=6400 g/mol, PD=1.23), solid.

B Application Examples

Powder Coating Examples

Example 1B

Non-Pigmented Powder Coatings Based on a Carboxyl-Functional Polyester and a Hydroxyalkylamide as Hardener The powder coating composition is based on a carboxy-functional polyester, components 1 to 4 (formulation without levelling agent) or components 1 to 5 (formulation containing the levelling agent) as indicated in Table 1.

TABLE 1

| | Formulation | | |
|---|---|---|---|
| | Examples (amount in grams) | | |
| Components | 1.1 comparative | 1.2-1.4 | 1.5 comparative |
| 1. Crylcoat ® 2532[a] | 960 | 960 | 960 |
| 2. Primid ® XL 552[b] | 35 | 35 | 35 |
| 3. Ceridust ® 9615[c] | 3 | 3 | 3 |
| 4. Benzoin[d] | 2 | 2 | 2 |
| 5. Levellingagent | — | 10 | 10[e] |
| Total: | 1000 | 1010 | 1010 |

[a] Crylcoat ® 2532, carboxy-functional polyester from UCB S.A., Drogenbos, Belgium
[b] Primid ® XL 552, N,N,N',N'-tetrakis(2-hydroxyethyl)adipamide from EMS, Domat, Switzerland
[c] Ceridust ® 9615, wax from Clariant AG, Muttenz, Switzerland
[d] Benzoin from Fluka AG
[e] Modaflow P 3 from UCB Surface Specialties, USA commercial levelling agent.

The components are mixed using a planetary stirrer. The mixture is then extruded on a prism extruder at 300 revolutions/minute at 110° C. and is rolled out. The powder coating composition is coarsely comminuted using a bench cutter and is ground in a Retsch ZM-1 ultracentrifugal mill with a 0.75 mm annular-perforation screen at 15,000 revolutions/minute. Finally, the powder is passed through a 125 μm sieve on a centrifugal sieving machine having an average particle size of from 30 to 50 μm.

The finished powder coating composition is sprayed electrostatically to a coat thickness of 70 to 80 μm onto aluminium panels using an ESB-Wagner corona cup gun at 60 kV. The coated panels are cured in an electric oven at 180° C. for 10 minutes.

The following parameters are determined:

1) yellowness: b* ISO 7724 (ASTM D 2244). Large values of b* denote strong yellowing.

2) gloss @ 200 measured with a BYK Gardner haze-gloss in accordance with the manufacturer's suggested method of operation. High gloss values indicate high reflectance of the coating films.

3) DOI (distinctness of reflected image) with a BYK Gardner wave-scan DOI in accordance with the manufacturer's suggested method of operation. While a DOI value at zero is for a perfect diffusion, a DOI value of 100 means a perfect mirror image indicating a very smooth surface.

4) Longwave with a BYK Gardner wave-scan DOI in accordance with the manufacturer's suggested method of operation. Longwave values of lesser magnitude are indicative for coatings that are smoother in appearance.

TABLE 2

| Results after curing for 10 minutes at 180° C. | | | | | |
|---|---|---|---|---|---|
| Example | Flow agent | b* | Gloss @ 20° | Longwave | DOI |
| 1.1B | — | 7 | — | — | — |
| 1.2B | Example 10A | 9 | 84 | 33 | 87 |
| 1.3B | Example 1A | 5 | 90 | 31 | 85 |
| 1.4B | Example 4A | 9 | 91 | 56 | 81 |
| 1.5B | Modaflow P3 | 17 | 83 | 28 | 87 |

Example 2B

White Pigmented Powder Coatings Based on a Carboxyl-Functional Polyester and a Hydroxyalkylamide as a Hardener All powder coatings are prepared and their parameters are determined as described in Example 1B. The formulations are given in Table 3.

TABLE 3

| | Formulations | | |
|---|---|---|---|
| | Examples (amount in grams) | | |
| Components | 2.1 comparative | 2.2-2.3 | 2.4 comparative |
| 1. Crylcoat ® 2532[a] | 670 | 670 | 670 |
| 2. Primid ® XL 552[b] | 25 | 25 | 25 |
| 3. Ceridust ® 9615[c] | 3 | 3 | 3 |
| 4. Benzoin[d] | 2 | 2 | 2 |
| 5. Kronos ® 2160[e] | 300 | 300 | 300 |
| 6. Levelling agent | — | 10 | 10[f] |
| Total: | 1000 | 1010 | 1010 |

[a] Crylcoat ® 2532, carboxy-functional polyester from UCB S.A., Drogenbos, Belgium
[b] Primid ® XL 552, N,N,N',N'-tetrakis(2-hydroxyethyl)adipamide from EMS, Domat, Switzerland
[c] Ceridust ® 9615, wax from Clariant AG, Muttenz, Switzerland
[d] Benzoin from Fluka AG
[e] Kronos ® 2160 (TiO$_2$) from Kronos, Germany
[f] Modaflow ® P 3 from UCB Surface Specialties, USA, commercial levelling agent

TABLE 4

| Results after curing for 10 minutes at 180° C. | | | | | |
|---|---|---|---|---|---|
| Example | Flow agent | b* | Gloss @ 20° | Longwave | DOI |
| 2.1B | — | 4 | — | — | — |
| 2.2B | Example 10A | 3 | 82 | 61 | 82 |
| 2.3B | Example 1A | 4 | 80 | 67 | 79 |
| 2.4B | Modaflow P3 | 4 | 81 | 56 | 83 |

Example 3B

Non-Pigmented Powder Coatings Based on GMA-Acrylic and DDDA as Hardener

All powder coatings are prepared and their parameters are determined as described in Example 1B.

TABLE 5

| | Formulation | | |
|---|---|---|---|
| | Examples (amount in grams) | | |
| Components | 3.1 comparative | 3.2 | 3.3 comparative |
| 1. Almatex ® PD7610[a] | 790 | 790 | 790 |
| 2. DDDA[b] | 170 | 170 | 170 |
| 3. Tinuvin ® 144[c] | 10 | 10 | 10 |
| 4. Tinuvin ® 405[d] | 20 | 20 | 20 |
| 5. Worlee ® ADD 902[e] | 10 | 10 | 10 |
| 6. Levelling agent | — | 10 | 10[f] |
| Total: | 1000 | 1010 | 1010 |

[a] Almatex ® PD7610, GMA-acrylic resin from Anderson, USA
[b] DDDA is Dodecanedioic acid from DuPont, Germany
[c] Tinuvin ® 144 is a sterically hindered amine light stabiliser from Ciba Specialty Chemicals, Basel, Switzerland
[d] Tinuvin ® 405 is a UV-absorber from Ciba Specialty Chemicals, Basel, Switzerland
[e] Worlée ® ADD 902 from Worlée Chemie, Germany
[f] Additol ® XL 490, commercial flow agent from UCB Surface Specialties, USA

TABLE 6

Results after curing for 30 minutes at 160° C.

| Example | Flow agent | b* | Gloss @ 20° | Longwave | DOI |
|---|---|---|---|---|---|
| 3.1B | — | 0.3 | — | — | — |
| 3.2B (DFT = 70 μm) | Example 10A | 0.2 | 79 | 4 | 92 |
| 3.3B (DFT = 70 μm) | Additol ® XL 490 | 0.4 | 79 | 5 | 91 |
| 3.2B (DFT = 40 μm) | Example 10A | −0.1 | 79 | 14 | 91 |
| 3.3B (DFT = 40 μm) | Additol ® XL 490 | −0.1 | 78 | 18 | 89.5 |

DFT = Dry Film Thickness

Example 4B

Non-Pigmented Powder Coatings Based on GMA-Acrylic and DDDA as Hardener

All powder coatings are prepared and their parameters are determined as described in Example 1B.

TABLE 7

| | Formulations | | |
|---|---|---|---|
| | Examples (amount in grams) | | |
| Components | 4.1 comparative | 4.2-4.8 | 4.9 comparative |
| 1. Almatex ® PD7610 | 795 | 790 | 790 |
| 2. DDDA | 170 | 170 | 170 |
| 3. Tinuvin ® 144 | 10 | 10 | 10 |
| 4. Tinuvin ® 405 | 20 | 20 | 20 |
| 5. Benzoin | 5 | 10 | 10 |
| 6. Levelling agent | — | 10 | 10[e] |
| Total: | 1000 | 1010 | 1010 |

[e] Powdermate ® 468 CFL, commercial levelling agent from Troy Chemical Company BV, Netherlands

TABLE 8

Results after curing for 20 minutes at 170° C.

| Example | Flow agent | b* | Gloss @ 20° | Longwave | DOI |
|---|---|---|---|---|---|
| 4.1B | — | 2.5 | — | — | — |
| 4.2B | Example 11A | 2.6 | 80 | 10 | 86.5 |
| 4.3B | Example 3A | 2.8 | 81 | 11 | 85 |
| 4.4B | Example 12A | 3.6 | 80 | 11 | 84 |
| 4.5B | Example 13A | 3 | 82 | 15 | 84 |
| 4.6B | Example 8A | 2.8 | 83 | 11 | 84 |
| 4.7B | Example 6A | 2.5 | 83 | 16 | 84 |
| 4.8B | Example 5A | 2.6 | 84 | 17 | 85 |
| 4.9B | Powdermate 486 CFL | 2.9 | 82 | 25 | 85.5 |

Example 5B

Non-Pigmented Powder Coatings Based on GMA-Acrylic and DDDA as Hardener

All powder coatings are prepared and their parameters are determined as described in Example 1B.

TABLE 9

| | Formulations | |
|---|---|---|
| | Examples (amount in grams) | |
| Components | 5.1 comparative | 5.2-5.3 |
| 1. Almatex ® PD7610 | 549 | 545 |
| 2. DDDA | 119 | 119 |
| 3. Tinuvin ® 144 | 7 | 7 |
| 4. Tinuvin ® 405 | 14 | 14 |
| 5. Benzoin | 3.5 | 3.5 |
| 6. Levelling agent | 7.5[a] | 11.5 |
| Total: | 700 | 700 |

[a] Additol XL 490

TABLE 10

Results after curing for 30 minutes at 160° C.

| Example | Flow agent | b* | Gloss @ 20° | Longwave | DOI |
|---|---|---|---|---|---|
| 5.1B | -Additiol XL 490 | 1.9 | 83.1 | 8.8 | 91.3 |
| 5.2B | Example 14A | 2.0 | 84.9 | 8.2 | 91.8 |
| 5.3B | Example 15A | 2.1 | 85.3 | 12.6 | 91.5 |

The invention claimed is:

1. A coating composition comprising a1) physically drying film forming binder resin or resins;

a2) thermally cross linking film forming binder resin or resins;

a3) radiation curable film forming binder resin or resins;

a4) autoxidatively drying film forming binder resin or resins; or a5) a combination of binder resins with at least two different crosslinking mechanisms selected from a1), a2), a3) and a4);

b) a polymer or copolymer levelling agent of formula (I)

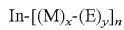

$$\text{In-}[(M)_x\text{-}(E)_y]_n \qquad (I)$$

obtained by
b1) polymerization in the presence of an alkoxyamine initiator/regulator of formula

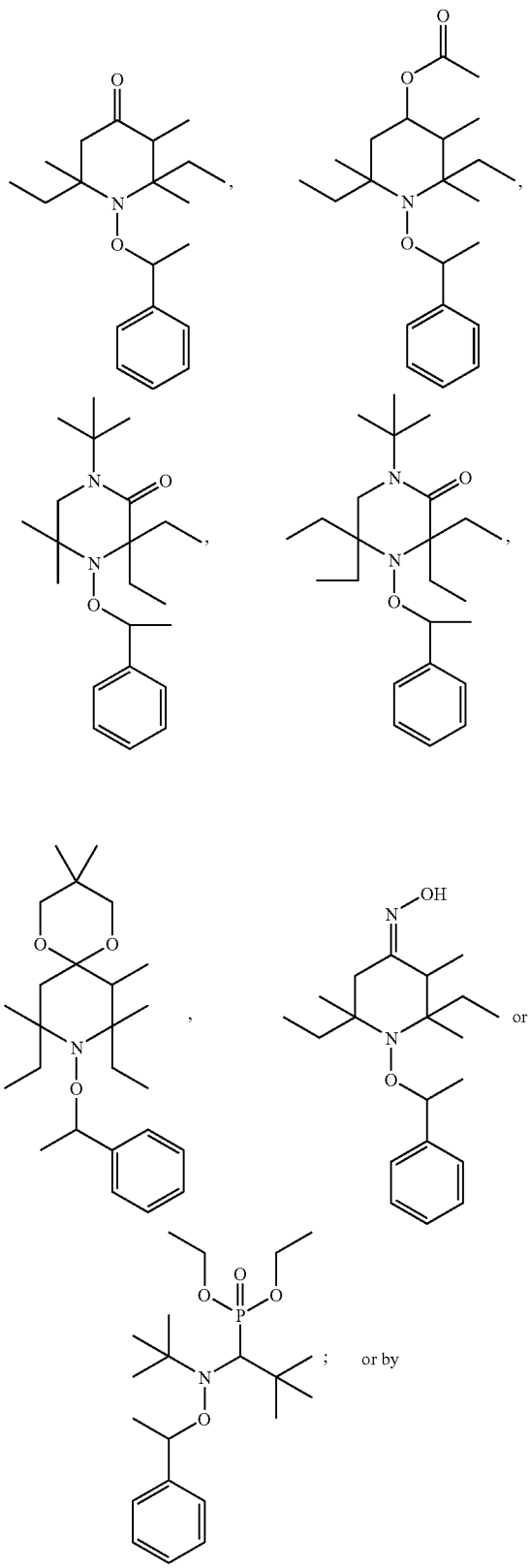

b2) polymerization in the presence of a stable nitroxyl free radical of formula

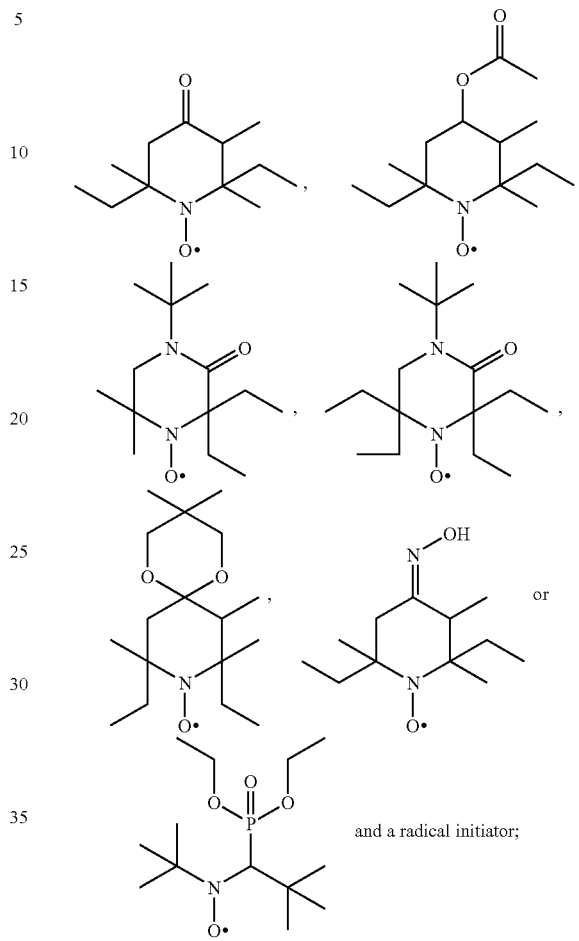

and a radical initiator;

wherein

In is the initiator fragment starting the polymerization reaction;

M is at least one monomer selected from the group consisting of acrylic acid, methacrylic acid, acrylic acid ($C_1$-$C_{22}$)alkyl esters, acrylic acid ($C_1$-$C_{22}$)hydroxyalkyl esters, methacrylic acid ($C_1$-$C_{22}$)alkyl esters, methacrylic acid ($C_1$-$C_{22}$)hydroxyalkyl esters, acrylic acid ($C_1$-$C_{22}$)alkyl esters or methacrylic acid ($C_1$-$C_{22}$)alkyl esters which are substituted by amino, ($C_1$-$C_{22}$)alkylamino, ($C_1$-$C_{22}$)dialkylamino, —$SO_3H$, epoxy, fluoro, perfluoro or siloxane groups, styrene, substituted styrene, acrylamide and methacrylamide, N-mono($C_1$-$C_{22}$)alkyl acrylamide, N,N-di($C_1$-$C_{22}$)alkyl acrylamide, and a multifunctional monomer with two or more ethylenically unsaturated bonds;

provided that the amount of unsubstituted acrylic acid ($C_1$-$C_{22}$)alkyl esters or/and methacrylic acid ($C_1$-$C_{22}$)alkyl esters is more than 30% by weight based on the weight of the total monomer mixture;

E is a group bearing the stable nitroxyl free radical which is bound via the oxygen atom to the polymer or copolymer;

x is the total number of monomer units, which is a number between 5 and 5000;

y is a number 1 or greater than 1 indicating the average number of end groups E attached to the monomer sequence $(M)_x$;

n is a number from 1 to 20; and c) optionally water or/and one or more organic solvents.

2. A coating composition according to claim 1, comprising a2) a thermally cross linking film forming binder resin or resins; or a3) a radiation curable film forming binder resin or resins.

3. A coating composition according to claim 1, comprising a2) a thermally cross linking film forming binder resin or resins.

4. A coating composition according to claim 1, comprising a2) a thermally cross linking film forming binder resin or resins without water and organic solvent, which is in the form of a solid powder.

5. A coating composition according to claim 1, wherein the leveling agent of formula (I) is obtained by b1) polymerization in the presence of an alkoxyamine initiator/regulator of formula (O1)

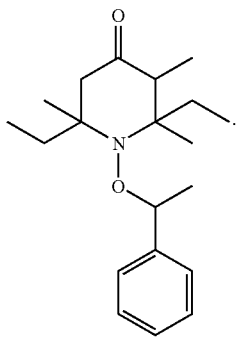

(O1)

6. A coating composition according to claim 1, wherein the levelling agent, component b), has a polydispersity of between 1.0 and 2.0.

7. A coating composition according to claim 1, wherein the levelling agent, component b), has a glass transition temperature between 20° C. and 200° C.

8. A coating composition according to claim 1, wherein the levelling agent, component b), is composed of at least 30% by weight of tert-butylacrylate and/or tert-butylmethacrylate, based on the weight of total monomers.

9. A coating composition according to claim 1, wherein the levelling agent, component b), is a linear polymer or copolymer, where in formula (I) n is 1.

10. A coating composition according to claim 1, wherein in formula (I), component b), y is 1.

11. A coating composition according to claim 1, wherein the levelling agent, component b), has a number average molecular weight of between 3000 to 50000 g/mol (Dalton).

12. A coating composition according to claim 1, wherein the levelling agent, component b), is composed of at least 30% by weight of tert-butylacrylate and/or tert-butylmethacrylate, and 0.5 to 50% of a functional monomer which is selected from the group consisting of acrylic acid, methacrylic acid, acrylic acid $(C_1-C_6)$hydroxyalkyl esters, methacrylic acid $(C_1-C_6)$hydroxyalkyl esters, acrylic acid $(C_1-C_6)$ alkyl esters and methacrylic acid $(C_1-C_6)$alkyl esters which are substituted by amino, $(C_1-C_6)$alkylamino, $(C_1-C_6)$dialkylamino, epoxy, fluoro, perfluoro or siloxane groups.

13. A coating composition according to claim 1, wherein the levelling agent, component b), is composed of at least 50% by weight of tert-butylacrylate and/or tert-butylmethacrylate and is a solid at room temperature.

14. A coating composition according to claim 1, wherein the levelling agent, component b), is present in an amount of 0.1 to 15% by weight, based on the weight of the film forming binder resin or resins, component a).

15. A process for improving the levelling of a coating composition according to claim 1, which process comprises the steps of applying the coating composition to a substrate and exposing it to thermal energy or electromagnetic radiation in order to obtain a homogenous solid coating.

* * * * *